United States Patent
Scott et al.

(10) Patent No.: US 7,237,109 B2
(45) Date of Patent: Jun. 26, 2007

(54) INTEGRATED SECURITY IN A PROCESS PLANT HAVING A PROCESS CONTROL SYSTEM AND A SAFETY SYSTEM

(75) Inventors: Cindy Scott, Georgetown, TX (US);
Gary Law, Georgetown, TX (US);
Michael G. Ott, Austin, TX (US);
Godfrey Sherriff, Austin, TX (US)

(73) Assignee: Fisher- Rosemount Systems, Inc., Austin, TX (US)

( * ) Notice: Subject to any disclaimer, the term of this patent is extended or adjusted under 35 U.S.C. 154(b) by 764 days.

(21) Appl. No.: 10/672,549

(22) Filed: Sep. 26, 2003

(65) Prior Publication Data

US 2004/0148513 A1    Jul. 29, 2004

Related U.S. Application Data

(63) Continuation-in-part of application No. 10/352,396, filed on Jan. 28, 2003.

(51) Int. Cl.
*G06F 1/24* (2006.01)

(52) U.S. Cl. .................. 713/164; 713/166; 713/168; 713/193

(58) Field of Classification Search ................ 713/164, 713/166, 168, 193
See application file for complete search history.

(56) References Cited

U.S. PATENT DOCUMENTS 5,168,441 A    12/1992    Onarheim et al.

(Continued)

FOREIGN PATENT DOCUMENTS

EP    0 472 169    2/1992

(Continued)

OTHER PUBLICATIONS

Bailey, "Introducing Bailey Evolution 90TM . . .The Sound Investment Strategy for Process Automation", 1993.

(Continued)

*Primary Examiner*—Thomas R. Peeso
(74) *Attorney, Agent, or Firm*—Marshall, Gerstein & Borun LLP

(57) ABSTRACT

A process plant includes a safety system that is physically and logically integrated with a process control system such that the safety system and the process control system can use common security, communication and display hardware and software within the process plant while still providing functional isolation between the safety system controllers and the process control system controllers. This integrated process control and safety system uses a common data communication structure for both the safety system and the process control system so that applications can send data to and receive data from devices in either system in the same manner, e.g., using the same communication hardware and software. However, the common data communication structure is set up enable a security application to distinguish process control system devices from safety system devices using tags, addresses or other fields within the messages sent to or received from the devices, which enables data associated with the process control system to be distinguishable from data associated with the safety system, thereby enabling the security application within a user interface to automatically treat this data differently depending on the source (or destination) of the data.

67 Claims, 7 Drawing Sheets

U.S. PATENT DOCUMENTS

| | | | |
|---|---|---|---|
| 5,321,829 A | 6/1994 | Zifferer | |
| 5,539,906 A | 7/1996 | Abraham et al. | |
| 5,631,825 A | 5/1997 | van Weele et al. | |
| 5,812,394 A | 9/1998 | Lewis et al. | |
| 6,138,174 A | 10/2000 | Keeley | |
| 6,157,864 A | 12/2000 | Schwenke et al. | |
| 6,161,051 A * | 12/2000 | Hafemann et al. | 700/86 |
| 6,167,316 A | 12/2000 | Gloudeman et al. | |
| 6,415,418 B1 | 7/2002 | McLaughlin et al. | |
| 6,442,512 B1 * | 8/2002 | Sengupta et al. | 703/6 |
| 6,442,515 B1 | 8/2002 | Varma et al. | |
| 6,477,435 B1 | 11/2002 | Ryan et al. | |
| 6,515,683 B1 * | 2/2003 | Wright | 715/772 |
| 6,546,297 B1 | 4/2003 | Gaston et al. | |
| 6,587,108 B1 | 7/2003 | Guerlain et al. | |
| 6,684,385 B1 | 1/2004 | Bailey et al. | |

FOREIGN PATENT DOCUMENTS

| | | |
|---|---|---|
| EP | 0 813 129 | 8/1998 |
| EP | 1 091 274 | 4/2001 |
| GB | 2 275 813 | 9/1994 |
| WO | WO-97/49018 | 12/1997 |

OTHER PUBLICATIONS

Bailey, "Wide-Range, Fully Compatible Family of Process Automation and Mangement Systems", 1993.

Computer Products, "Unbundling the DCS", approximately 1992.

Elsag Bailey, "Elsag Bailey Automation", approximately 1993.

Fisher-Rosemount, "Managing the Process Better", Dec. 1993.

Honeywell, "Process Manager Specification and Technical Data", Sep. 1991.

Fisher-Rosemount, "Managing the Process Better", Sep. 1993.

Honeywell, "TDC 3000 Overview", approximately 1992.

Honeywell, "TDC 3000 Process Manager", approximately 1992.

Honeywell, "UDC 6000 Process Controller", Aug. 1992.

Leeds and Northrup, "Make Your Automation Plan a Reality: MAX 1000", approximately 1990.

Toshiba, "Toshiba Integrated Control Systems", Nov. 1990.

Reliance Electric Company, "Multitasking Capability Simplifies Process Control Design", approximately late 1980's by Angelo J. Notte.

Search Report under Section 17(5) issued in GB 0401718.2 application by the United Kingdom Patent Office on Jul. 1, 2004.

Examination Report under Section 18(3) issued GB 0401718.2 application by the United Kingdom Patent Ofice on Sep. 28, 2005.

* cited by examiner

INTEGRATED SECURITY IN A PROCESS PLANT HAVING A PROCESS CONTROL SYSTEM AND A SAFETY SYSTEM

RELATED APPLICATION

This application is a continuation-in-part of U.S. patent application Ser. No. 10/352,396, entitled "Process Control System with an Embedded Safety System," which was filed on Jan. 28, 2003, the disclosure of which is hereby expressly incorporated by reference herein.

FIELD OF TECHNOLOGY

The present invention relates generally to safety systems used in process plants and, more particularly, to a safety system that is functionally and logically embedded with or integrated into a process control system of a process plant.

DESCRIPTION OF THE RELATED ART

Process control systems, like those used in chemical, petroleum or other processes, typically include one or more process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses to the field devices to control the operation of the process. Information from the field devices and the controllers is typically made available to one or more applications executed by the operator workstation to enable an operator to perform any desired function with respect to the process, such as configuring the process, viewing the current state of the process, modifying the operation of the process, etc.

Furthermore, in many processes, a separate safety system is provided to detect significant safety related problems within the process plant and to automatically close valves, remove power from devices, switch flows within the plant, etc. when a problem occurs that might result in or lead to a serious hazard in the plant, such as a spill of toxic chemicals, an explosion, etc. These safety systems typically have one or more separate controllers, apart from the process control system controllers, which are connected to safety field devices via separate buses or communication lines disposed within the process plant. The safety controllers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event is detected, the safety controller takes some action to limit the detrimental effect of the event, such as closing valves, turning devices off, removing power from sections of the plant, etc.

Isolation between process controllers and safety controllers is considered important (and is frequently mandated by applicable government standards) because using a process controller to perform safety functions results in the simultaneous failure of the safety functions and the process control functions when that process controller fails. However, the safety functions become most critical when the process controller fails because, at that time, the process is partially or wholly out of control.

The isolation between the process controllers and the safety controllers in process plants has led to these systems being developed by different persons using different hardware and software. In fact, in some cases, because safety systems do not use the process control system hardware and software infrastructure, different and completely unconnected safety system hardware and software is used at different locations, such as at different nodes, within the same process plant. In any event, the isolation between the process control system and the safety system leads to a number of different and unconnected safety systems in the same plant that must be configured and monitored separately. As a result, different communication infrastructure is typically used to implement these different systems within the same plant, with different configuration and diagnostic applications and workstations being used to configure and monitor these separate systems. Likewise, different personnel are typically needed to perform configuration, diagnostic and monitoring activities with respect to these different systems, all of which leads to extra costs in terms of configuring and running a process plant that uses a safety system. Moreover, because the safety system configuration and diagnostic software is different from the control system configuration and diagnostic software, persons must typically be trained separately on these different software programs leading to increased training time.

There have, in the past, been attempts to integrate data from the process control and safety systems in the same plant on the same user interface to thereby provide the viewing of and manipulation of this different data at the same location. However, this integration is typically performed after the fact using traditional control system configuration, viewing and diagnostics applications as the basic software platform, and then importing safety system data into the control system software. Unfortunately, traditional control systems do not provide the flexibility to differentiate safety system data from control system data. As a result, once the safety system information is integrated into the control system applications, the safety system values appear the same as the control system values being displayed to the user, making it difficult to track or differentiate the safety system data.

Moreover, these integrated display systems typically require the safety system data to be mapped into the control system configuration to enable a user to understand where the safety system data originates with respect to control system hardware. In these cases, separate software within a user interface is used to map data between the two systems because of the different architectures used to define the data (or the tags indicating the source or destination of the data) associated with the two systems. These data mapping techniques require additional user programming both to set up and to maintain and may lead to erroneous data due to errors introduced by the mapping function.

Still further, security becomes harder to handle in systems which attempt to integrate safety system data into a traditional control system application. While some user interface or human machine interface (HMI) products (as opposed to control systems) are capable of providing unique security on individual HMI data values/tags, an additional user program must still be set up within the HMI to ensure that each value and/or tag is correctly marked as being from a safety system to ensure that this security is invoked. This function is inherently more error prone and hence less secure because it relies on the person programming and maintaining the HMI to ensure that all values from the safety system are correctly mapped into the control system interface. Furthermore, such a mapping technique makes the HMI safety critical, which complicates the safety instrumentation system, making it much more difficult to test and prove the safety integrity level.

As a result, these known user interface integration systems lack the ability to place safety instrumentation system read and write values directly on a user graphic without requiring mapping between the control and the safety system configurations or without special safety instrumentation control logic located in the safety system controllers that creates a 'firewall' between the operator interface and the safety instrumentation system logic, to thereby prevent unauthorized writes to the safety instrumentation system. Moreover, these known integrated user interface systems lack a secure write mechanism that assures that no corruption of the entered value or path takes place during a write to the safety instrumentation system, and lack unique safety security built into the control system that assures that all writes of values to the safety instrumentation system require special privileges, whether from a process graphic or any other application able to write values in the safety instrumentation system.

Additionally, the configurations of the safety system and the control system have typically been created and viewed using different configuration applications stored in separate locations within the process plant, and there has been little or no interaction (interconnection) between safety system configuration data and process control system configuration data. As a result, it is difficult for a user to view or understand the configuration of the control system and the safety system in an integrated manner, e.g., in a manner that displays or shows the way in which these two systems interact with one another or in which the devices and logic associated with the different systems are physically and logically interconnected within the plant.

In the same manner, diagnostic applications associated with control and safety systems, such as alarming, testing and other diagnostic tools, have in many cases been performed separately, making it difficult for a single user to understand how problems in one system may effect or relate to problems within the other system. Additionally, these separate diagnostic applications have resulted in the alarms and other diagnostic data associated with the different systems being presented on different displays, typically to different users, or on the same display at different times using different programs. This non-integrated use and display of diagnostic data makes it more difficult to understand the operation of the entire plant and the manner in which the safety system interacts with the process control system during operation of the plant.

While it is known to provide an integrated display of process control system and safety system alarms, as indicated above, the safety system alarms are essentially mapped into the process control system alarm display environment as a process control system alarm. As a result, safety system alarms are essentially presented as process control system alarms, which makes it difficult for users of the alarm display to easily recognize or separate safety system alarms from process control system alarms. Additionally, because the safety system alarms must be converted into process control system alarms for display purposes, the converted safety system alarms are time-stamped as of the time that they are created within the process control system, i.e., when the alarms are converted by the display application, instead of being time stamped with the time that these alarms are actually detected within the safety system. As a result, data pertaining to the actual time that the safety alarms are generated in the safety system is lost, resulting in misleading information for alarm logging, acknowledgement and response purposes.

SUMMARY OF THE DISCLOSURE

A process plant includes a safety system that is physically and logically integrated with a process control system in a manner that enables the safety system and the process control system to use common communication, configuration, diagnostic and display hardware and software within the process plant while still providing fictional isolation between the safety system controllers and the process control system controllers. As is typical, separate safety system controllers are connected via safety communication infrastructure to safety field devices while process control system controllers are connected to control system field devices via standard control system busses or communication lines. However, the safety system controllers are communicatively connected to the process control system controllers via a bus or other communication channel and each is connected to one or more operator workstations within the process plant via a common communication network, which enables software within the operator workstations to communicate with, configure and view the operation of both the process control system controllers (and related process control field devices) and the safety system controllers (and related safety field devices).

This integration includes using a common data communication structure for both the safety system and the process control system so that applications can send data to and receive data from devices in either system in the same manner, e.g., using the same communication hardware and software. However, the common data communication structure may distinguish process control devices from safety devices using tags, addresses or other fields within the messages sent to or received from the devices, which enables data associated with the process control system to be distinguishable from data associated with the safety system, thereby enabling an application within a user interface to automatically treat this data differently depending on the source (or destination) of the data.

In one example, display, configuration, control and diagnostic applications may enable writes to be performed to (or reads to be made from) both the process control system devices and the safety system devices, while automatically enforcing security procedures on the writes to the safety system devices that are not needed for the writes to the process control system devices, or vice versa. These writes may be enabled, however, from the same display that distinguishes writes to the safety system from writes to the process control system based on the field of the display into which the data to be written is placed. In this manner, the display, configuration, control and diagnostic applications can make writes to either system without the need to map data from the process control system to the safety system or vice versa.

Additionally, configuration and diagnostic applications can provide a common interface for performing configuration and diagnostic activities within the process plant for both the process control system and the safety system. In particular, a configuration application may enable a user to configure either or both of the process control system and the safety system and may store the configuration information in a common database with known associations between the process control system devices (logic) and the safety system devices (logic) to make it easier to understand the interrelationships between the control system configuration and the safety system configuration. Still further, a common configuration screen may display both process control system configuration information and safety system configuration information and data generated in one of these systems may be used in the configuration or implementation of the other one of these systems without a separate mapping procedure being performed. This common or integrated configuration application makes it easier to configure the entire plant using a single configuration application which, in turn, eliminates the need to train the same or separate users on different configuration applications.

Likewise, diagnostic applications may be programmed to use data from both the process control system and the safety system to perform integrated diagnostics without losing track of the source of the diagnostic data. For example, an alarm display application may be used to display both process control system alarms and safety system alarms on the same interface, to rank the alarms by priority and to provide some indication of the relationship between these alarms, e.g., that a particular process control system alarm is related in some manner to a particular safety system alarm. Because the alarms are sent to the diagnostic application using a common communication format that distinguishes between safety system devices and process control system devices, the diagnostic application can detect whether an alarm is generated within the process control system or the safety system, and may display both types of alarms without losing track of where and when these alarms were generated.

DETAILED DESCRIPTION

Figure 1:
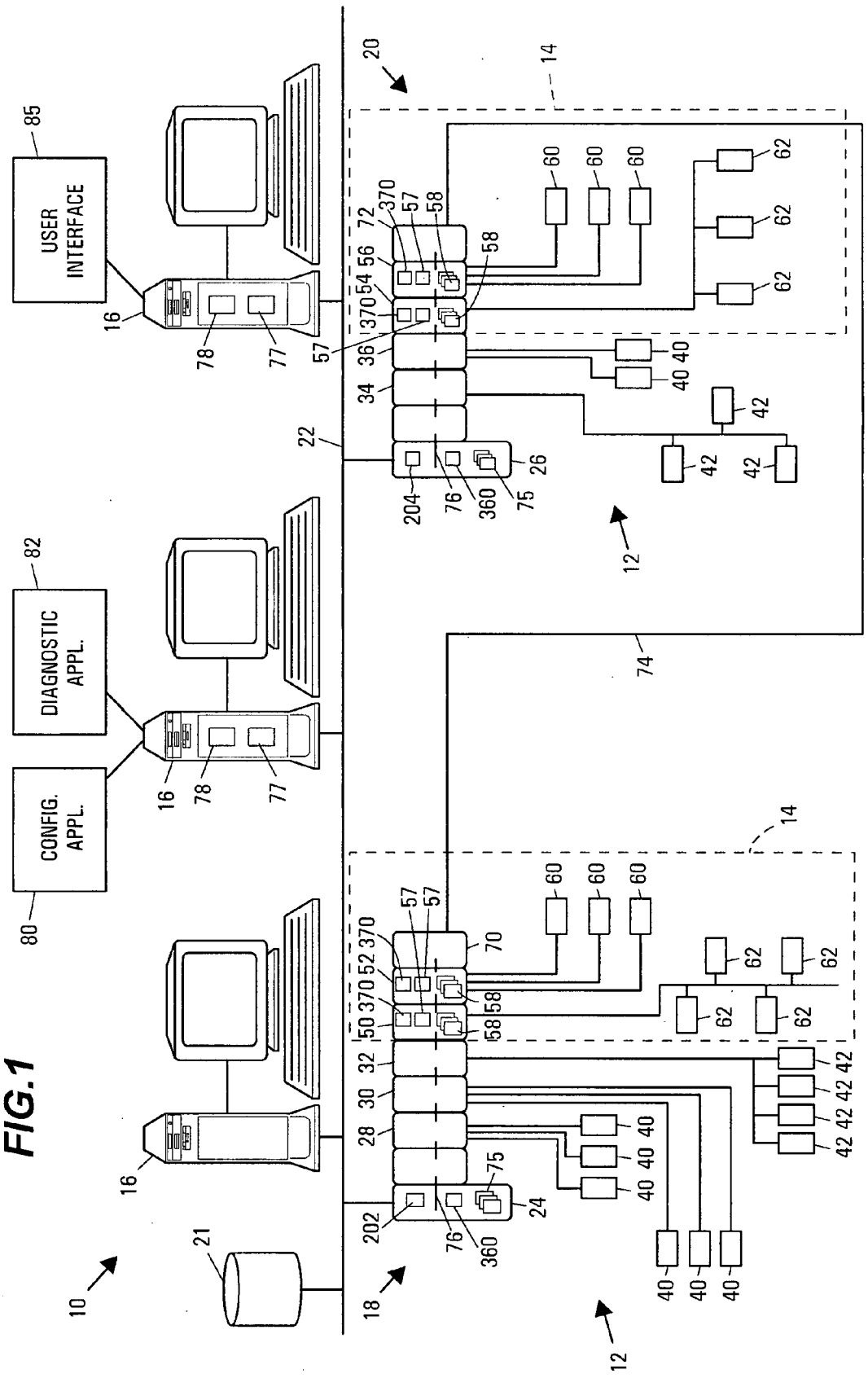
FIG. 1 is a block diagram of an exemplary process plant having a safety system integrated with a process control system and including interface, configuration and diagnostic applications that provide integrated security, configuration and diagnostic activities with respect to the process control system and the safety system.

Referring now to FIG. 1, a process plant 10 includes a process control system 12 integrated with a safety system 14 (indicated by dotted lines), which generally operates as a Safety Instrumented System (SIS) to monitor and override the control provided by the process control system 12 to maximize the likely safe operation of the process plant 10. The process plant 10 also includes one or more host workstations, computers or user interfaces 16 (which may be any type of personal computers, workstations, etc.) that are accessible by plant personnel, such as process control operators, maintenance personnel, configuration engineers, etc. In the example illustrated in FIG. 1, three user interfaces 16 are shown as being connected to two separate process control/safety control nodes 18 and 20 and to a configuration database 21 via a common communication line or bus 22. The communication network 22 may be implemented using any desired bus-based or non-bus based hardware, using any desired hardwired or wireless communication structure and using any desired or suitable communication protocol, such as an Ethernet protocol.

Generally speaking, each of the nodes 18 and 20 of the process plant 10 includes both process control system devices and safety system devices connected together via a bus structure that may be provided on a backplane into which the different devices are attached. The node 18 is illustrated in FIG. 1 as including a process controller 24 (which may be a redundant pair of controllers) as well as one or more process control system input/output (I/O) devices 28, 30 and 32 while the node 20 is illustrated as including a process controller 26 (which may be a redundant pair of controllers) as well as one or more process control system I/O devices 34 and 36. Each of the process control system I/O devices 28, 30, 32, 34 and 36 is communicatively connected to a set of process control related field devices, illustrated in FIG. 1 as field devices 40 and 42. The process controllers 24 and 26, the I/O devices 28–36 and the controller field devices 40 and 42 generally make up the process control system 12 of FIG. 1.

Likewise, the node 18 includes one or more safety system logic solvers 50 and 52, while the node 20 includes safety system logic solvers 54 and 56. Each of the logic solvers 50–56 is an I/O device (also variously referred to as a safety controller) having a processor 57 that executes safety logic modules 58 stored in a memory and is communicatively connected to provide control signals to and/or receive signals from safety system field devices 60 and 62. Additionally, each of the nodes 18 and 20 may include at least one message propagation device (MPD) 70 or 72, which are communicatively coupled to each other via a ring type bus connection 74 (only a portion of which is illustrated in FIG. 1). The safety system logic solvers 50–56, the safety system field devices 60 and 62, the MPDs 70 and 72 and the bus 74 generally make up the safety system 14 of FIG. 1.

The process controllers 24 and 26, which may be, by way of example only, DeltaV™ controllers sold by Emerson Process Management or any other desired type of process controllers are programmed to provide process control functionality (using what are commonly referred to as control modules) using the I/O devices 28, 30 and 32 (for the controller 24), the I/O devices 34 and 36 (for the controller 26) and the field devices 40 and 42. In particular, each of the controllers 24 and 26 implements or oversees one or more process control routines 75 (also referred to a control modules) stored therein or otherwise associated therewith and communicates with the field devices 40 and 42 and the workstations 14 to control the process 10 or a portion of the process 10 in any desired manner. The field devices 40 and 42 may be any desired types of field devices, such as sensors, valves, transmitters, positioners, etc., and may conform to any desired open, proprietary or other communication or programming protocol including, for example, the HART or the 4–20 ma protocol (as illustrated for the field devices 40), any fieldbus protocol such as the Foundation® Fieldbus protocol (as illustrated for the field devices 42), or the CAN, Profibus, the AS-Interface protocols, to name but a few. Similarly, the I/O devices 28–36 may be any known types of process control I/O devices using any appropriate communication protocol(s).

The safety logic solvers 50–56 of FIG. 1 may be any desired type of safety system control devices include a processor 57 and a memory that stores safety logic modules 58 adapted to be executed on the processor 57 to provide control functionality associated with the safety system 14 using the safety field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4–20 ma protocol, while the safety field devices 62 are illustrated as using a bus communication protocol, such as a Fieldbus protocol. Typically, the safety devices (both the safety system logic solvers (controllers) 50–56 and the safety system field devices 60 and 62 used as part of the safety system 14 will be rated as safety devices, which typically means that these devices must go through a rating procedure to be rated by an appropriate body as a safety device.

A common backplane 76 (indicated by a dotted line through the controllers 24, 26, the I/O devices 28–36, the safety logic solvers 50–56 and the MPDs 70 and 72) is used in each of the nodes 18 and 20 to connect the controllers 24 and 26 to the process control I/O cards 28, 30 and 32 or 34 and 36, as well as to the safety logic solvers 52 and 54 or 56 and 58 and to the MPDs 70 or 72. The controllers 24 and 26 are also communicatively coupled to, and operate as a bus arbitrator for the bus 22, to enable each of the I/O devices 28–36, the logic solvers 52–56 and the MPDs 70 and 72 to communicate with any of the workstations 16 via the bus 22.

As will be understood, the use of the backplane 76 in each of the nodes 18 and 20 enables the safety logic solvers 50–56 to communicate locally with one other to coordinate safety functions implemented by each of these devices, to communicate data to one another, or to perform other integrated functions. On the other hand, the MPDs 70 and 72 operate to enable portions of the safety system 14 that are disposed at vastly different locations of the plant 10 to still communicate with one another to provide coordinated safety operation at different nodes of the process plant 10. In particular, the MPDs 70 and 72 in conjunction with the bus 74 enable the safety logic solvers associated with different nodes 18 and 20 of the process plant 10 to be communicatively cascaded together to allow for the cascading of safety-related functions within the process plant 10 according to an assigned priority. Alternatively, two or more safety-related functions at different locations within the process plant 10 may be interlocked or interconnected without having to run a dedicated line to individual safety field devices within the separate physical areas or nodes of the plant 10. In other words, the use of the MPDs 70 and 72 and the bus 74 enables a configuration engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10.

Figure 2:
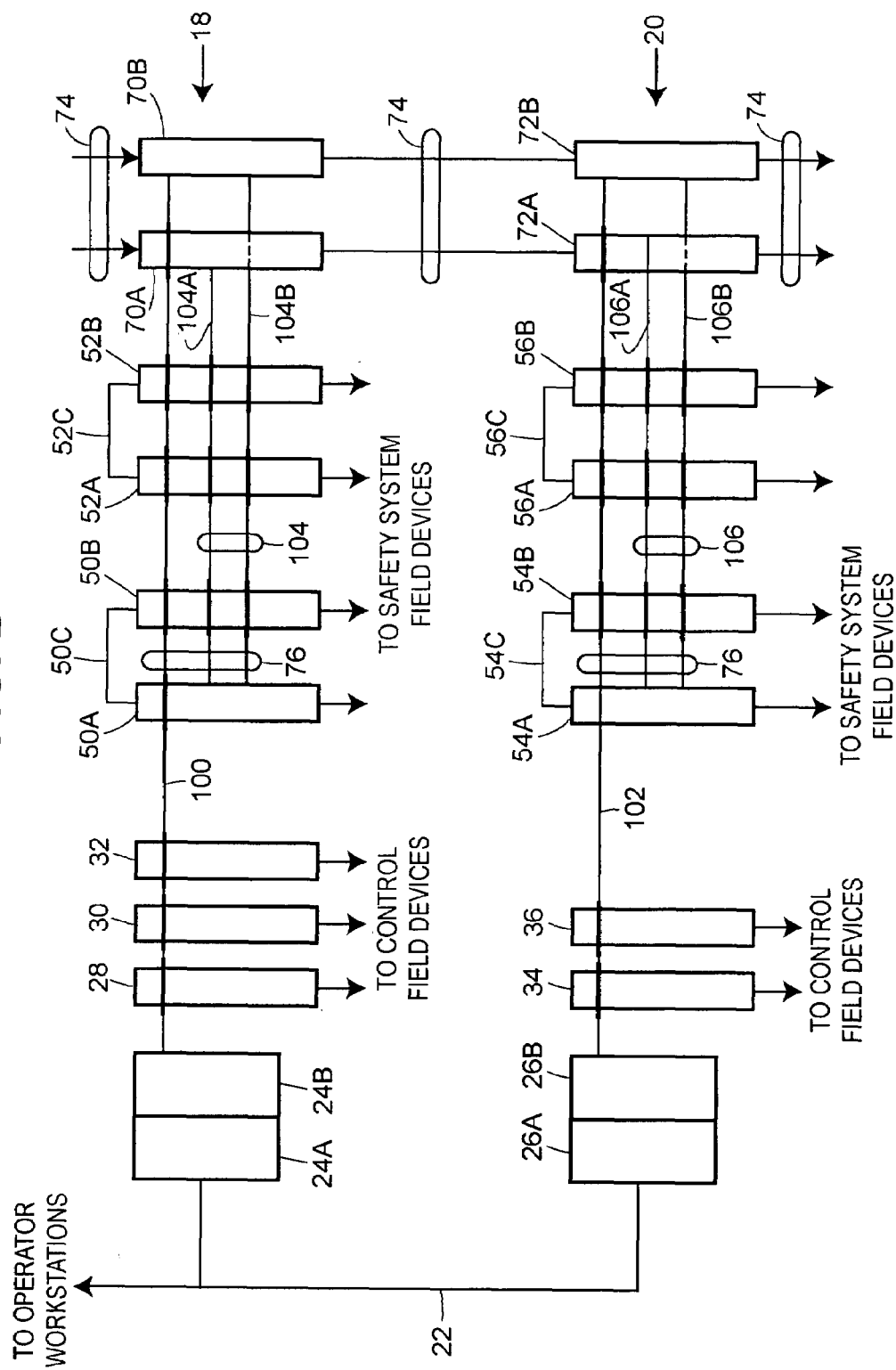
FIG. 2 is a block diagram of multiple safety system controllers communicatively connected with one another via a first communication network and additionally connected with process control system controllers and operator interfaces via a second and common communication network.

FIG. 2 illustrates the communication connections within and between the nodes 18 and 20 of the process plant 10 in more detail. Generally speaking, the components of FIG. 1 that are illustrated in FIG. 2 are referred to the by same reference numerals. However, each of the controllers 24 and 26 is illustrated in FIG. 2 as a redundant controller pair 24A, 24B and 26A and 26B which may use any standard redundancy techniques. Likewise, each of the safety logic solvers 50–56 is illustrated as a pair of devices having a primary safety logic solver 50A, 52A, 54A, and 56A and a secondary safety logic solver 50B, 52B, 54B and 56B in each pair. As will be understood, each of the pair of safety logic solvers 50–56 is connected to safety field devices (not illustrated in FIG. 2) and may store the same safety logic modules 58 for use in performing safety functions within the safety system 14. Each pair of safety logic solvers 50–56 includes a dedicated bus 50C, 52C, 54C and 56C connected between the primary and secondary logic solvers to provide control communications between the logic solver pair. The primary and secondary safety logic solvers preferably are running and performing calculations at the same time, and the outputs of these two devices may be communicated to each other and confirmed via the appropriate buses 50C, 52C, 54C and 56C. If desired, the primary device may include voting logic that determines the output of the pair of safety logic solvers based on the output of both of the primary and secondary devices. Alternatively, any desired or known redundancy techniques may be used for the pairs of logic solvers 50–56.

Moreover, each of the MPDs 70 and 72 is illustrated as a redundant pair of devices 70A, 70B and 72A, 72B with the MPDs of the different nodes 18 and 20 being connected with a redundant pair of inter-node communication lines or buses 74. While the communication interconnections between only two nodes 18 and 20 are illustrated in FIGS. 1 and 2, it will be understood a single or a redundant pair of MPDs may be located in any number of different nodes of the process plant 10 and may be connected with each other in a ring type bus structure to provide inter-node communications in any desired manner. Because a ring bus communication structure is generally (although not necessarily) used, the MPDs of the first node will be connected to the MPDs of the second node, which will be connected to the MPDs of the third node, and so on, with the MPDs of the last node being connected to the MPDs of the first node, all via the ring bus 74. If only two nodes exist in the process plant 10, such as illustrated in FIG. 1, the bus 74 coming out of the MPDs 72A and 72B of the node 20 will be connected directly to the inputs of the MPDs 70A and 70B of the node 18.

In addition to illustrating the connection between the controllers 24 and 26 and the workstations of FIG. 1, FIG. 2 illustrates the backplanes 76 in more detail. In particular, at the node 18, the controllers 24A and 24B are connected to the I/O devices 28, 30 and 32, to the redundant pairs of safety logic solvers 50A, 50B and 52A, 52B and to the redundant pair of the MPDs 70A and 70B via a railbus communication connection 100 which is preferably disposed in the backplane 76. In the same manner, at the node 20, the controllers 26A and 26B are connected to the I/O devices 34 and 36, to the pairs of safety logic solvers 54A, 54B and 56A, 56B and to the redundant pair of the MPDs 72A and 72B via a railbus communication connection 102 disposed in the backplane 76. The controllers 24 and 26 use the railbus connections 100 and 102 to provide communications between the workstations 14 on the one hand and the I/O devices 28–36 and the safety system logic solvers 50–56 and MPDs 70 and 72 on the other hand, as well as to provide communications between the I/O devices 28–36 on the one hand and the safety system logic solvers 50–56 and MPDs 70 and 72 on the other hand. In other words, the railbus lines 100 and 102 are used as the communication network that enables the safety system devices to be integrated with the process control system devices at a higher level within the process plant 10 so that the same configuration applications and display applications disposed within the workstations 14 may communicate with, configure and display information from both the process control system devices and the safety system devices.

Additionally, as illustrated with respect to the node 18, the backplane 76 includes a primary peer-to-peer (P2P) bus 104A that connects each of the safety system logic solvers 50 and 52 to the primary MPD 70A while a secondary P2P bus 104B connects each of the safety system logic solvers 50 and 52 to the secondary MPD 70B. The primary and secondary P2P buses 104A and 104B are local P2P buses which provide local communications between the safety logic solvers within a single backplane 76 as well as to the MPD 70 associated with or connected to that backplane 76. In a similar manner, the node 20 includes a primary peer-to-peer (P2P) bus 106A that connects each of the redundant pairs of safety system logic solvers 54 and 56 to the primary MPD 72A while a secondary P2P bus 106B connects each of the redundant pairs of safety system logic solvers 54 and 56 to the secondary MPD 72B. The primary and secondary P2P buses 106A and 106B are local P2P buses that provide local communications between the safety logic solvers and the MPD 72 within the backplane 76 of the node 20. As will be understood, the local primary and secondary P2P buses 104A, 104B, 106A, 106B provide redundant communication paths between all the safety related logic solvers 50–56 on the respective backplanes 76. If desired, the local P2P buses 104 and 106 may operate as broadcast buses, in that each safety logic solver and MPD device connected to the bus receives the transmissions of all of the other devices on that bus, and only one device can transmit at a time. Of course, while FIG. 2 illustrates two safety logic solvers connected to each of backplanes 76 in the different nodes 18 and 20, any desired number of safety logic solvers, which may be redundant pairs of logic solvers or stand-alone logic solvers, may be connected to the backplane 76 (and thereby connected to the local P2P bus 104 or 106) at each of the nodes 18 and 20.

If desired, the safety logic solvers may share the local P2P bus media using a time division multiple access (TDMA) methodology in which all the local safety logic solvers on a particular backplane are synchronized with each other. In one case, the local P2P buses 104 and 106 may use an RS485 Manchester encoded HDLC protocol with a throughput of, for example, 2 Mb/sec. This Manchester encoding scheme causes the wire to be driven at 4 Mb/s. The given rates are exemplary only, as other suitable rates and encoding schemes may be chosen as well. Furthermore, if desired, each of the local safety logic solvers on a particular backplane may determine or be assigned its transmission time slot within the TDMA scheme used on the backplane 76 based on its physical location in the backplane 76, which reduces the number of configuration steps needed to set up the backplane 76 at a particular node. Still further, the primary and secondary P2P buses 104 and 106 of the backplanes 76 may support any desired message types and the physical interconnections for the local P2P buses 104 and 106 may reside within the backplane 76.

The remote P2P buses 74 preferably use a ring topology to allow data to be communicated between safety logic solvers located at different nodes of the process plant 10 and, therefore, disposed on different backplanes 76. The MPDs 70 and 72 are responsible for propagating messages around the ring made up by the remote P2P bus 74, for placing messages directed from a safety logic solver on the same backplane as the MPD 70 or 72 to the ring 74 and for forwarding the messages which are on the ring 74 and addressed to a safety logic solver on the same backplane as an MPD 70 or 72 to that safety logic solver. While any number of messages may be propagated on the remote P2P bus 74, one embodiment provides a maximum of thirty two (32) messages to be propagated during any P2P bus cycle. These messages can originate from 1 to 32 separate and distinct safety logic solvers, including the safety logic solvers 50–56 on the backplanes 76 of the nodes 18 and 20, as well as any other backplanes at other nodes in the process plant 10 interconnected by the ring bus 74. As a result of this operation, however, all of the safety logic solvers in the safety system 14 may operate synchronously, even when they are located at different nodes, because the ring bus 74 provides a communication interconnection between these devices which enables synchronization to be accomplished. The ring bus 74 may use any desired type of bus structure and protocol, but preferably uses point-to-point twisted pair cables with a 10Base-T Ethernet protocol or fiber optic cables and a 10base-F Ethernet protocol which has a 10 Mbit/sec. transmission rate.

Referring again to FIG. 1, each of the workstations 16 includes a processor 77 and a memory 78 that may store any number of user interface, configuration, diagnostic and/or viewing applications adapted to be executed on the processor 77. A configuration application 80 and a diagnostic application 82 are illustrated in an exploded view in FIG. 1 as being stored in one of the workstations 16 while a user interface or display application 85 is illustrated as being stored in a second one of the workstations 16. However, if desired, these applications could be stored and executed in different ones of the workstations 16 or in other computers associated with the process plant 10. Generally speaking, the configuration application 80 provides configuration information to a configuration engineer and enables the configuration engineer to configure some or all elements of the process plant 10 and to store that configuration in the configuration database 21. As part of the configuration activities performed by the configuration application 80, the configuration engineer may create control routines or control modules for the process controllers 24 and 26, may create safety logic modules 58 for any and all of the safety logic solvers 50–56 and may download these different control and safety modules to the appropriate ones of the process controllers 24 and 26 and the safety logic solvers 50–56 via the bus 22 and controllers 24 and 26. Similarly, the configuration application 80 may be used to create and download other programs and logic to the I/O devices 28–36, to any of the field devices 40, 42, 60 and 62, etc. As will be understood, these process control and the safety control modules for the separate process control and safety systems may be created independently of the devices in which these modules will be executed and may be communicatively tied together by directly referencing one another to thereby enable the process control system logic and the safety system logic to communicate with each other before being assigned to any particular devices. This feature enables the process control system and the safety system modules to be created and stored as templates, provides for easier portability of these modules when devices within the process plant are changed, removed, etc. and generally allows the logical configuration of both the process control system 12 and the safety system 14 prior to the physical devices associated with these systems being put into place.

Conversely, the diagnostic application 82 may be used to provide one or more displays to a user, such as to a process control operator, a safety operator, etc., which includes information about the state of the process control system 12 and the safety system 14 either in separate views or in the same view, if so desired. For example, the diagnostic application 82 may be an alarm display application that receives and displays indications of alarms to an operator. If desired, such an alarm viewing application may take the form as disclosed in U.S. Pat. No. 5,768,119 entitled "Process Control System Including Alarm Priority Adjustment" and U.S. patent application Ser. No. 09/707,580 entitled "Integrated Alarm Display in a Process Control Network," both of which are assigned to the assignee of this patent and are hereby expressly incorporated by reference herein. It will be understood, however, that the alarm display or alarm banner of these patents may receive and display alarms from both the process control system 12 and the safety system 14 in an integrated alarm display as the alarms from both systems 12 and 14 will be sent to the operator workstation 16 executing the alarm display application and will be recognizable as alarms from different types of devices, including as being alarms from either the process control system or the safety system. If desired, an operator may respond to (e.g., acknowledge, disable, etc.) safety alarms displayed in an alarm banner in the same manner as process control alarms. For example, the operator or user may acknowledge safety alarms, turn off safety alarms, etc. using any features of the alarm display. Such actions will send messages to the appropriate safety logic device 50–56 within the safety system 14 using communications over the bus 22 and the backplane 76 thereby causing the safety system 14 to take the corresponding action with respect to the safety alarm. In a similar manner, other diagnostic applications may display diagnostic information or data obtained from both the process control system 12 and the safety system 14 as these systems use the same types and kinds of parameters, security and referencing so that any data from one of the systems 12 and 14 can be integrated into a display or view traditionally provided for a process control system.

The user interface application 85 may be any type of interface that, for example, enables a user to manipulate data values (e.g., perform reads or writes) to thereby alter the operation of control or safety modules within either or both of the control system and the safety system while providing the correct level and type of security. Thus, for example, if a write is specified to be made to a control module associated with the control system 12, such as to one of the control modules 75 or to one of the field devices 42, for example, the application 85 enforces the correct security procedures to enable that write to take place. On the other hand, if the write is specified to be made to a module associated with the safety system 14, such as to one of the modules 58 or to one of the field devices 62, for example, the application 85 enforces the correct security measures and procedures to enable that write to occur and, if the security measures are met, sends the write command to the appropriate safety device without need of a further firewall in the safety system controllers 50–56.

In any event, the applications 80, 82 and 85 may send separate configuration, diagnostic and other signals to and may receive data from each of the process controllers 24 and 26 as well as from each of the safety system logic solvers 50–56. These signals may include process-level messages related to controlling the operational parameters of the process control-related field devices 40 and 42, may include safety-level messages related to controlling the operational parameters of the safety-related field devices 60 and 62 and may include device level messages related to the particulars of devices, both process control system devices and safety system devices. While the safety logic solvers 50–56 may be programmed to recognize both the process-level messages and the safety-level messages, the safety logic solvers 50–56 are capable of distinguishing between the two types of messages and will not be capable of being programmed or effected by process-level configuration signals. In one example, the programming messages sent to the process control system devices may include certain fields or addresses which are recognized by the safety system devices and which prevent those signals from being used to program the safety system devices. In particular, the tag (such as a path name) or address of the data to be sent to or received from a safety system device or routine, such as one of the safety system logic devices 50–56, may include a specific field or heading that identifies the device or unit as being associated with the safety system 14. If this is the case, write security software embedded within any application may determine when a write is being attempted to be made to safety system component by the tag or address associated with the data. When the security software determines that a write (or even a read) is being requested for the safety system, the security routine may automatically apply any desired security procedure such as checking the password and authorization of the user to make sure that the user has the privileges needed to make the write to (or the read from) the safety system device or logic unit.

If desired, the safety logic solvers 50–56 may employ the same or a different hardware or software design as compared to the hardware and software design used for the process control I/O cards 28–36. However, the use of alternate technologies for the devices within the process control system 12 and devices within the safety system 14 may minimize or eliminate common cause hardware or software failures.

The safety system devices, including the logic solvers 50–56, may also employ any desired isolation and security techniques to reduce or eliminate the chances of unauthorized changes being made to the safety-related functions implemented thereby. For example, the safety logic solvers 50–56 and the configuration application 80 may require a person with a particular authority level or a person located at a particular workstation to make changes to the safety modules within the logic solvers 50–56, with this authority level or location being different from the authority or access level or location needed to make changes to the process control functions performed by the controllers 24 and 26 and the I/O devices 28–36. In this case, only those persons designated within the safety software or located at workstations authorized to make changes to the safety system 14 have authorization to alter safety-related functions, which minimizes the chances of corruption to the operation of the safety system 14. As will be understood, to implement such security, the processors within the safety logic solvers 50–56 may assess the incoming messages for proper form and security and operate as gatekeepers on changes being made to the safety-level control modules 58 executed within the safety logic solvers 50–56. Alternatively, as described in more detail below, the applications generating the messages to the safety logic solvers 50–56 may implement security procedures and refuse to send a message when the security level of the user is not adequate to make a write to or a read from a safety system device.

Thus, if desired, once safety-related functions are enabled within the logic solvers 50–56, no change of status to the safety functions can be made via the operator workstations 16 without proper access rights, which enables the communication structure associated with the process control system 12 to be used to provide initialization for the safety system 14 and to be used to provide run-time reporting of the operation of the safety system 14, but to still isolate the process control system 12 from the safety system 14 in the sense that changes to the process control system 12 cannot impact the operation of the safety system 14.

Figure 3:
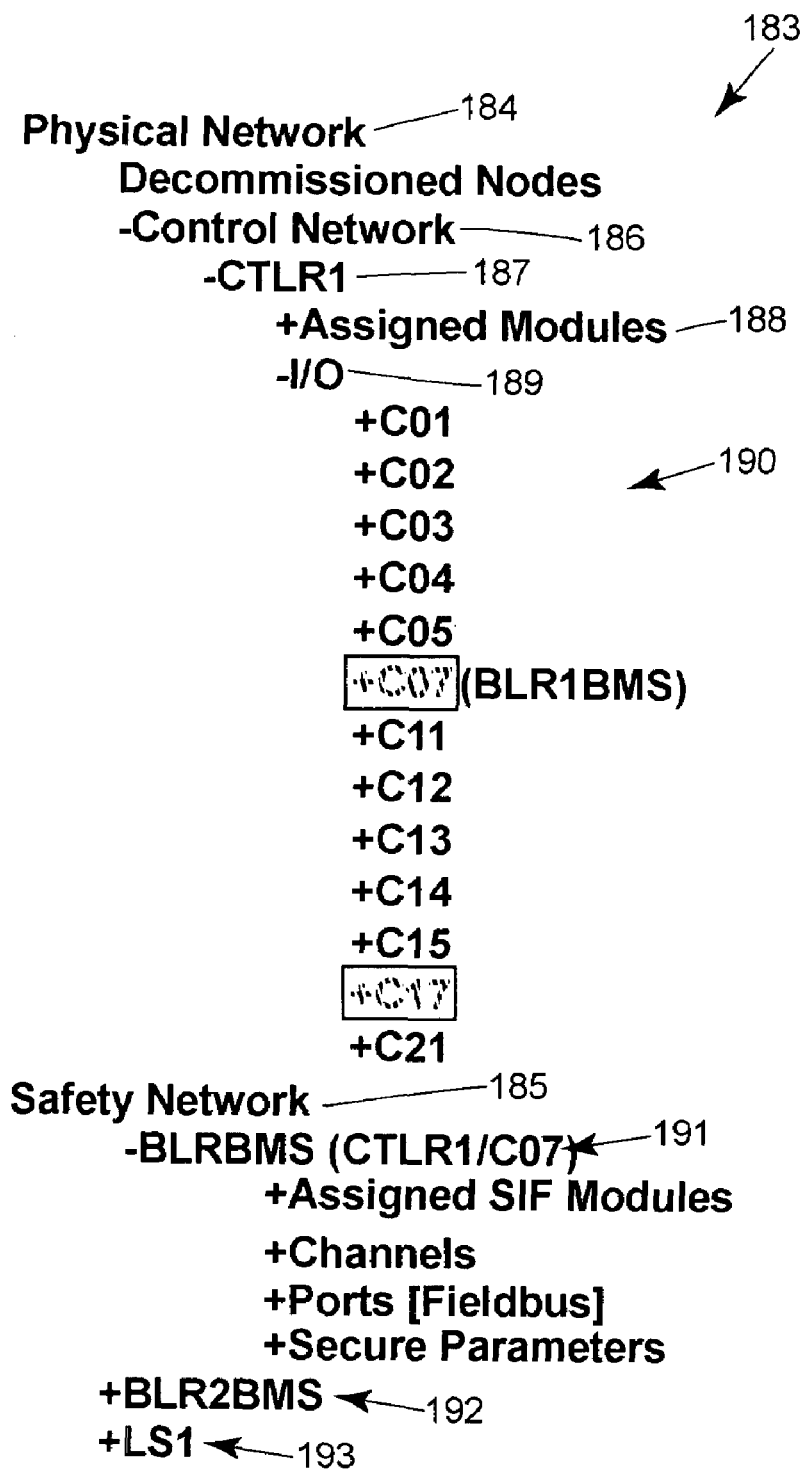
FIG. 3 is an example screen display generated by the configuration application of FIG. 1 illustrating a configuration view of the process plant of FIG. 1 showing both the process control system devices and safety system devices.

FIG. 3 illustrates a display screen 183 that may be generated by the configuration routine 80 of FIG. 1 depicting a configuration presentation in which the safety system 14 (including the logic solvers 50–56 and the safety field devices 60, 62) is integrated with the process control system 12. It will be understood that the configuration display screen 183 of FIG. 3 illustrates the manner in which the configuration application 80 has configured the software associated with the different devices within the process plant 10 and can be used by a configuration engineer to create or alter the current configuration of the process plant 10 by downloading new configuration software to the devices within the process plant 10, including the process control system devices and the safety system devices.

As illustrated in the display screen 183, the process plant 10 includes a physical network section 184 which is used for displaying the physical interconnections of the devices within the process plant 10 and a safety network section 185 which is used for configuring safety system devices. The physical network section 184 includes a control network section 186 having a controller 187 (named CTLR1). The controller 187, which may be one of the controllers 24, 26 of FIG. 1, includes a set of assigned modules 188 which are control modules stored in and executed by the controller 187 and an I/O devices section 189 connected to the controller 187 for communication purposes. The I/O devices section 189 is expanded to illustrate all of the cards 190 connected to the controller 187 (CTLR1) via one of the backplanes 76 of FIG. 1. In this example, the I/O devices section 189 includes process control input/output cards C01–C05, C11–C15 and C21. Each of these cards may be expanded to illustrate the identity of and other information associated with the different field devices (which are individual ones of the field devices 40 an 42 of FIG. 1) connected to each of these cards. Similarly, for illustration of the physical connections, two safety system cards C07 (named BLR1BMS) and CO17 (not yet configured) are illustrated in a shaded format and cannot be expanded in this section because they cannot be configured in or by the control network. However, as will be understood, the devices associated with the process control system 12 can be configured using the control network section 186 of the screen 183 by adding, deleting, or changing control modules, I/O devices and/or field devices in that section of the configuration presentation.

The safety system 14 is illustrated in the safety network section 185 of the display screen 183 as including three safety logic solvers 191–193 named BLR1BMS, BLR2BMS and LS1. Likewise, if desired, message propagation devices (such as the MPDs 70 and 72 of FIG. 1) may be illustrated in the safety network section 185. In the screen 183, the safety logic solver 191 is expanded to illustrate that it includes assigned safety modules, one or more channels (which are connected to safety field devices such as the devices 60 and 62 of FIG. 1) and secure parameters. Each of these elements could be further viewed, added to, deleted or changed in this section of the screen 183 to thereby configure the safety system 14. In particular, the safety system 14 can be configured and modified using the safety network section 185 in a manner similar to the manner of configuring the process control network 12 using the control network section 186. In fact, as will be understood, control or safety modules can be created and assigned to each of these different control and safety systems using the method for configuring a process control system as described in U.S. Pat. No. 5,838,563 which is assigned to the assignee of this patent and which is hereby expressly incorporated by reference herein.

Generally speaking, however, safety logic modules can be created from module template objects stored in a configuration library and adapted so as to be used in a particular safety logic solver to perform safety functions with respect to particular safety field devices within the process plant 10. To create a safety logic module, a safety engineer may copy a particular control template (which may be used to create both process control modules run in process controllers as well as safety logic modules run in safety logic solvers) to create a particular safety logic module and may assign that safety logic module to a particular safety element, such as to one of the safety logic solvers, by dragging and dropping that safety logic module on to or under an indication of the desired safety logic solver within the configuration display screen 183 of FIG. 3. In implementing the disclosed system, a new user role of safety engineer is created. When configuring the safety system 14, the configuration engineer who manages the process control portion may not have the appropriate privileges to configure safety modules, and thus configuration of the safety modules will be carried out by the safety engineer. Thus, security within the system will allow for the delineation of separate safety engineers and process configuration engineers.

In one particular example, a safety engineer may add safety logic solvers under the safety network section 185 by selecting an Add Logic Solver menu option (not shown) from a safety network menu (which may be a pop-up or a pull down menu, for example). At this time, a logic solver having the next available system name is created under the safety network 185. Automatically created system names may start with, for example, LS1 but can be renamed to any globally unique name within the configuration system for the process plant 10. FIG. 3 illustrates the case in which two logic solvers have been renamed and one (LS1) has not been renamed. At this point the logic solver is a still a placeholder, not bound to a physical logic solver. Thereafter, the user can drag and drop a logic solver from under the physical network section 184 (such as one of the cards under the I/O section 189) onto the safety network section 185 to bind a particular physical logic solver (i.e., a card) to the created placeholder. Once a particular logic solver under the safety network section 185 is bound, configuration changes made to that logic solver will be performed on and downloaded to the specified physical logic solver as specified under the physical network section 184. Furthermore, once bound, the logic solver under the safety network section 185 may show the physical path in parentheses and the logic solver (card) under the physical network section 184 may show the logic solver name in parentheses. The safety logic device 191 and the card CO7 are bound together in this manner in FIG. 3. The card CO7 under the physical network section 184 is hashed out to illustrate that it cannot be configured under the process control network section 186 but must, instead, be configured via the safety network section 185. Still further, a Ports [Fieldbus] section under the safety network section 185 indicates Fieldbus ports to which Fieldbus safety devices may be added or connected to the safety logic unit or safety controller 191.

If desired, binding may also be performed by dragging an unbound logic solver under the safety network section 185 to an unbound logic solver under the physical network section 184 or an unbound logic solver under the physical network section 184 may be dragged and dropped under the safety network section 185. In either case, binding a placeholder to a physical logic solver results in a reference shown in parentheses. Of course, dragging and dropping a placeholder under the safety network section 185 to I/O under a controller in a control network section is not supported (and in fact is prevented by the security system) so that it is not possible to create a logic solver card under a process controller I/O device. This provides functional separation between the process control devices and the safety devices. Lower level safety elements, such as safety field devices, safety modules, parameters, etc. may be assigned to or bound to a particular safety logic solver by placing (e.g., dragging and dropping) an indication of these lower level elements in the proper location of the screen display 183.

As will be understood, however, a similar technique can be used to configure the process control network 186 using the configuration screen 183 so that both the process control network (system) and the safety system can be configured using the same application and to specify the interrelationships between elements within the process control network and the safety network. Additionally, because the configuration application 80 uses the same naming construct to configure both the process control network 186 and the safety network 185 (with variations in the fields of these names being used to specify whether an element is associated with the process control network or the safety network), all other applications can easily determine whether data or signals originate from or are being sent to a process control element or a safety element based on the name or tag associated with the data. As a result of this common configuration and naming structure, data does not need to be mapped from the safety system to the process control system or vice versa. Instead, any application can receive data from and send data or commands to any of the process control devices or the safety system devices (assuming security measures are met) and understand to which system this data belongs based on the name or tag of the data or the name or tag of the device or logical entity to which the data is being sent.

Moreover, because of the common naming structure used between the process control system devices and logic and the safety system logic and devices, and because the configuration database stores data for all of these entities, a configuration engineer can have process control modules reference (communicate with) safety logic modules and vice versa without needing to perform any mapping. In fact, the configuration engineer can configure safety logic modules to reference process control logic modules, or vice versa, in the same manner that the engineer causes two safety logic modules or two process control logic modules to reference one another. As is known, such referencing may be accomplished graphically by drawing lines between the appropriate inputs and outputs of the two modules on a graphic configuration screen or by manually specifying the parameters to be referenced by the proper tag, name, address, etc. In one embodiment, such references may be made using the well known name and parameter referencing scheme. In this case, the name of the module or other entity and the parameter of that entity are specified as part of the tag (path) associated with a communication between the two modules.

Still further, if desired, the configuration data associated with the process control system and the safety system may be stored in a common database (such as the configuration database 21 of FIG. 1) and may be stored in an integrated manner in the common database and may be accessed by a single application, such as the configuration application 80 at any desired time. Alternatively, configuration data for different sections of the plant may be distributed out and stored at different locations within the plant 10. For example, the configuration data for the node 18 of the plant in FIG. 1 (for both the process control devices and the safety system devices associated with the node 18) may be stored in the controller 24 of the node 18 as a database or memory 202 and the configuration data for the node 20 of the plant in FIG. 1 (for both the process control devices and the safety system devices associated with the node 20) may be stored in the controller 26 of the node 20 as a database or memory 204.

In this manner, configuration activities may be implemented from the same configuration application to configure both the process control network 12 and the safety network 14 associated with the plant 10, and the configuration data for both of these systems may be integrated to illustrate the interrelationships between process control system hardware and software and the safety system hardware and software. Because of the common configuration paradigm being used, however, the naming and data addressing of the elements within the process control system 12 and the safety system 14 can be assured to provide a unique name or address for each device, so that safety system components (and data) may be easily distinguished from process control system components (and data). This, in turn, eliminates the need for mapping. As will be understood, the configuration application 80 uses a common tagging, naming, addressing, and referencing format for both the process control system (and all logical and physical entities therein) and the safety system (and all logical and physical entities therein).

Still further, all shared configuration and runtime items that are location (or AREA) dependent only need to be defined once for the process control system and the safety system (not separately for each system) because the process control modules and the safety modules are bound together within the same area. This is logical because each area is a logical grouping of equipment having both process control system equipment (and logic) and safety system equipment (and logic). For example, there may be several boilers in an area, which might be called "BOILERS." Each boiler within the "BOILERS" area has its own safety equipment and logic and process control equipment and logic. Thus, by having the safety modules in the same logical location as the process modules in the area "BOILERS," all relevant information is kept together for the user and is accessible via a single or common configuration application. If desired, in this example, a user can add another 'directory-like folder' (such as the folders illustrated in FIG. 3) called UNITS under the "BOILERS" area. In this folder, there might be a Boiler Unit 1, a Boiler Unit 2 and a Boiler Unit 3 associated with three different boilers. Again, both safety modules and process control modules may be placed under the correct Boiler Unit directory to indicate which safety modules (and process control modules) are used for which boiler unit, thereby providing further granularity in the configuration display.

As will be understood, therefore, safety instrumented system configuration and process control system configuration can be performed from the same engineering applications, which enables configuration viewing, management, testing, backup, etc. to be performed from a single location. In particular, a single configuration database management routine, such as a back up routine which backs up the configuration database, an importation routine, which imports data into the configuration database and other routines, may be used on both the process control system data and the safety system data within the configuration database, thereby reducing the number of supporting applications needed with separate systems. Still further, the safety instrumented functions for a particular section (e.g., area) of the plant 10 may be configured and saved in the same location as the process control configuration for that same section (e.g., area).

As a result, all relevant information for an area from both a process control and a safety system perspective are in a single location and are configured with the same application. In particular the process control system elements (such as the process controllers 24, 26 or the field devices 40, 42 and the modules or other logic executed therein) and the safety system elements (such as the safety controllers 50–56 or the safety field devices 60, 62 and the modules or other logic executed therein) are logically configured together by the same application within an area, regardless of which controller is used to execute the process control or the safety system logic. As a result, the configuration logic for both the process control system and the safety system can be created prior to knowing how many controllers there are, where the controllers are located in the system (address and/or name), and to which controller the logic will be assigned. Because of this fact, the physical layout of the process control system does not need to be known to configure the safety modules. This configuration being performed on a logical basis instead of a physical basis also enables easy portability between systems, easy re-assignment of modules to logic solvers in response to changes in physical layouts within the process plant and creating generic library templates to be used to create process control and safety system configuration logic. Also, because references between safety modules are performed by the safety module name/parameter, communication between safety modules can be configured independently of the logic solver to which the safety modules are assigned.

As noted above, while process control and safety system configuration is integrated, the configuration application will have security measures that may define the users that can perform configuration activities on the process control and the safety system separately. In particular, the configuration application 80 may be set up to be accessed via different user accounts, with each user account being associated with a particular user entity. A user entity may be one or more users and, in some cases, may be an application that operates independently of a human being. For the sake of ease, users and user accounts will be referred to interchangeably herein.

As will be understood, each user account may have or be assigned different access privileges that define the rights of the user entity with respect to both the process control system and the safety system. The same user account may have different access privileges for process control system configuration functions as for safety system configuration functions and each user account may define some level of access for both the process control system and the safety system, even if that access is none. If desired any particular user account may have access privileges that allow the user entity to take one or more actions with respect to the only the process control system, to take one or more actions with respect to only the safety system or to take one or more actions with respect to both the process control and the safety system. Still further, different levels of access privileges may be defined for each of the process control system and the safety system including, for example, a level that enables a user entity to read process control or safety system data, a level that enables a user to write or change process control or safety system parameters or settings, a level that enables a user to create process control or safety system modules or other logic, a level that enables a user to download process control or safety system modules to appropriate devices and a level that enables a user to perform calibration procedures on one or more process control or safety system devices. Of course, any user entity can be given any number of these access privileges for either or both of the process control system and the safety system and other possible levels of privileges may be used as well or instead of those listed here.

Thus, a process control engineer may be prevented from configuring the safety system within the plant and a safety system engineer may be prevented from configuring the process control system within the plant. As indicated above, the security system, which performs user security for configuration and runtime privileges, may be fully integrated into a single application (such as the configuration application) for both the process control and the safety system. As noted above, user accounts may be set up to define the privileges that a particular user has at a particular location (or within a particular application). If desired, runtime user span of control may be defined by area, as well as by process control and safety system functionality. Thus, an operator can be given access to both the safety system and the process control system for one or more particular areas, but not to other areas. In this manner, security may be performed on a combined user and location basis. If desired, the security may also be implemented based on the location of or the computer which is executing the configuration application so that a user may have to have the proper access privileges at a particular computer to be able to perform configuration functions from that computer.

As will be understood, safety system configuration activities may be defined as interconnected logical elements (like function blocks or modules) in a graphical display, in the manner disclosed in U.S. Pat. Nos. 5,838,563; 5,940,294 and 6,078,320, all of which are hereby expressly incorporated by reference herein. In this case, safety system functionality or logic (in the form of the safety system modules) may be created independently of having to define what actual safety system hardware will execute that logic and what safety system I/O channels will be used. Once the hardware and channel definitions have been defined, simple hardware and 110 assignment operations (such as the drag and drop operations on the configuration screen of FIG. 3) may be used to bind the logic to the hardware. This operation allows safety system functions to be highly portable between safety systems and provides greater flexibility in setting up the hardware location and channel addressing for the safety system 14. Still further, similar to process control modules, the safety system logic modules can be stored as templates in a library for easy reuse to enable the same general type of safety module to be reusable for similar equipment, or identical equipment in different areas of the plant. In this manner, safety system logic templates can be copied to the appropriate areas and assigned to the safety system hardware.

Still further, because a safety system is typically smaller than its associated process control system, it is important to be able to easily find and view the safety system hardware and logic separately from the process control system hardware and logic, to view assignment of safety system logic modules to safety system hardware. The configuration system as described above with respect to FIG. 3 performs this function by enabling the configuration information of the safety system 14 and the process control system 12 to be separated or distinguished under different headings in the configuration diagram.

Moreover, information from the safety system logic is typically required in the process control system for the purpose of interlocking, etc. As suggested above, this has traditionally required that the configuration of the safety system be mapped into holding registers or other well defined data structures for the process control system to be used by the process control system in control strategies. With the integrated configuration described above, the safety system information and data is readily available to the process control system logic without mapping this data, because all of this data and information is provided in and stored an integrated configuration and, thus, data from safety system can be directly utilized in the process control system logic in exactly the same manner as data from other parts of the process control system logic can be used in process control system logic. This integration reduces both the time and the complexity for the configuration, and also significantly reduces errors associated with mapping of data.

As will be understood, configuration and status data of the safety system devices are also integrated within this single configuration environment. This includes both the device specific information and device related control system information such as configuration for device alarms. With some communication protocols, such as Foundation Fieldbus, control information can reside in the field devices themselves. If the intent is to utilize this information as part of a safety system function, then the ability to have this information in the same single configuration environment is important to understanding the logic. Additionally, status information from any part of the safety system 14, including the sensors, actuators, and logic solvers, can be utilized in either the control system 12 or the safety system 14 as appropriate. For example, the degrading of voting schemes based on device health, or the adjustment of an interlock in the control system 12 can be made based on device health. Such sharing of information between the process control system 12 and the safety system 14 would be extremely difficult to accomplish without an integrated configuration environment.

As will be understood from the above discussion, with the integrated configuration, all tagging, parameter references, naming, security, etc. may be configured from one common database. This allows users to leverage investment, training, etc. provided in the process control system for safety critical functions. In addition, the common explorer view (such as that of FIG. 3 which integrates process control devices and logic with safety system devices and logic) enables a user to easily differentiate between process, device, and safety functions, to set context to the appropriate item on the view, to clearly differentiate commands for the selected item in-context, etc. Also, the integrated hierarchy provides for easy navigation, searching, reporting, etc of tagged items. Setting preferences on the explorer view also allows the functions that are not required for the user to be hidden. In fact, if desired, each user or user account can have different preferences which effects the manner in which the configuration information is displayed for that user, including process control system configuration information and safety system configuration information.

In addition to configuration activities, diagnostic activities associated with the process control system 12 and the safety system 14 may be integrated in a common application and a common view or display provided to a user. In particular, the diagnostic application 82 of FIG. 1 may provide diagnostic information and perform diagnostic activities for both the process control system 12 and the safety system 14 using a common interface. In one example, the diagnostic application 82 may be an alarm viewing application that receives alarms of any type, such as process alarms/alerts, devices alarms/alerts, communication alarms/alerts, etc., generated by or detected within both the process controllers 24 and 26 and within the safety logic solvers 50–56. Because the messages sent by the process controllers 24 and 26 and the safety logic solvers 50–56 are distinguishable as being associated with process control hardware/software or safety system hardware/software, these alarms or alerts can be integrated on a common display or in a common diagnostic application while keeping track of and displaying the source of the alarm, that is, whether the alarm is a safety system alarm or a process control system alarm and while keeping track of when the alarm was originally created or timestamped by the process control system 12 or the safety system 14.

More particularly, because the diagnostic application 82 of FIG. 1 can recognize both process control and safety system alarms in the same manner discussed above with respect to the configuration application 80, it does not need to map one type of alarm into a display built for the other type of alarm. Instead, the application 82 can simply use the alarm detection and timestamping generated during the creation of the alarm message by one of the logic solvers 50–56 or one of the process controllers 24 or 26 and display this information on a user interface in any convenient format. The diagnostic application 82 can, however, apply consistent rules to each of the alarms received by the process control system hardware or the safety system hardware to determine alarm priority, to control acknowledgement of alarms and to enable/disable features of both process control and safety system alarms.

As will be understood, to enable the integration of alarms, alarm detection software or logic within the process controllers 24 and 26 detect, timestamp and send alarms to the diagnostic application 82 as is usual in a process control system. Additionally, alarm detection software or logic within the safety logic controllers 50–56 detect, timestamp and send alarm messages to the diagnostic application 82.

The format of the process control alarm messages (sent by the controllers 24 and 26) and the safety system alarm messages (sent by the logic solvers 50–56) will be similar in that both will have the same or a common format, have a timestamp field, an alarm name or type field, etc. Additionally, the messages will have some indication, such as a field, an address, a tag, etc. that will identify the message or alarm as originating in either a process control system device or a safety system device. The diagnostic application 82 can then use this indication to display, on an alarm display, that a particular alarm is a safety system alarm or a process control system alarm. Additionally, the diagnostic application 82 can provide different acknowledgement, viewing and enable/disable features for any alarm based on whether the alarm is a safety system alarm or a process control system alarm. For example, the diagnostic application 82 may illustrate an alarm as a different color, in a different area of the display, with a different name, etc. based on whether the alarm is a process control system alarm or a safety system alarm. Similarly, the diagnostic application 82 may enable filtering or sorting of the alarms by any categories, such as priority, name, type and/or whether the alarm is a safety system alarm or a process control system alarm. However, the diagnostic application 82 may categorize safety system and process control system alarms (for priority) using a common set of rules to provide consistent categorization of alarms in both the process control system and the safety system. Additionally, the timestamp of the alarms will reflect when they are first detected within either the process control system 12 or the safety system 14, thus leading to better and more accurate information as to when alarms were generated within the process control and safety systems.

Figure 4:
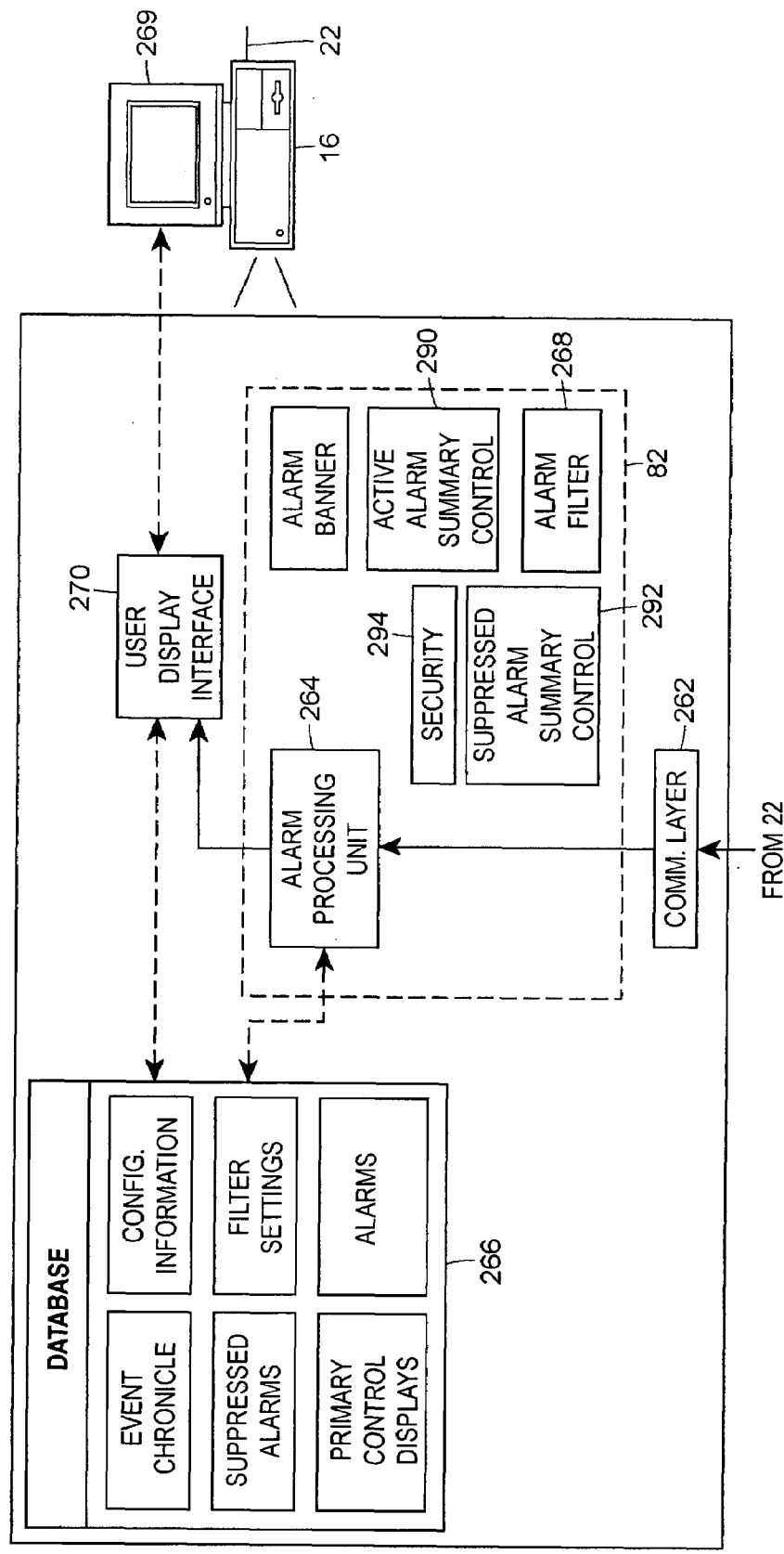
FIG. 4 is a block diagram of the diagnostic application of FIG. 1 which is adapted to integrate the display and manipulation of process control system and safety system alarms in a single user interface.
Figure 5:
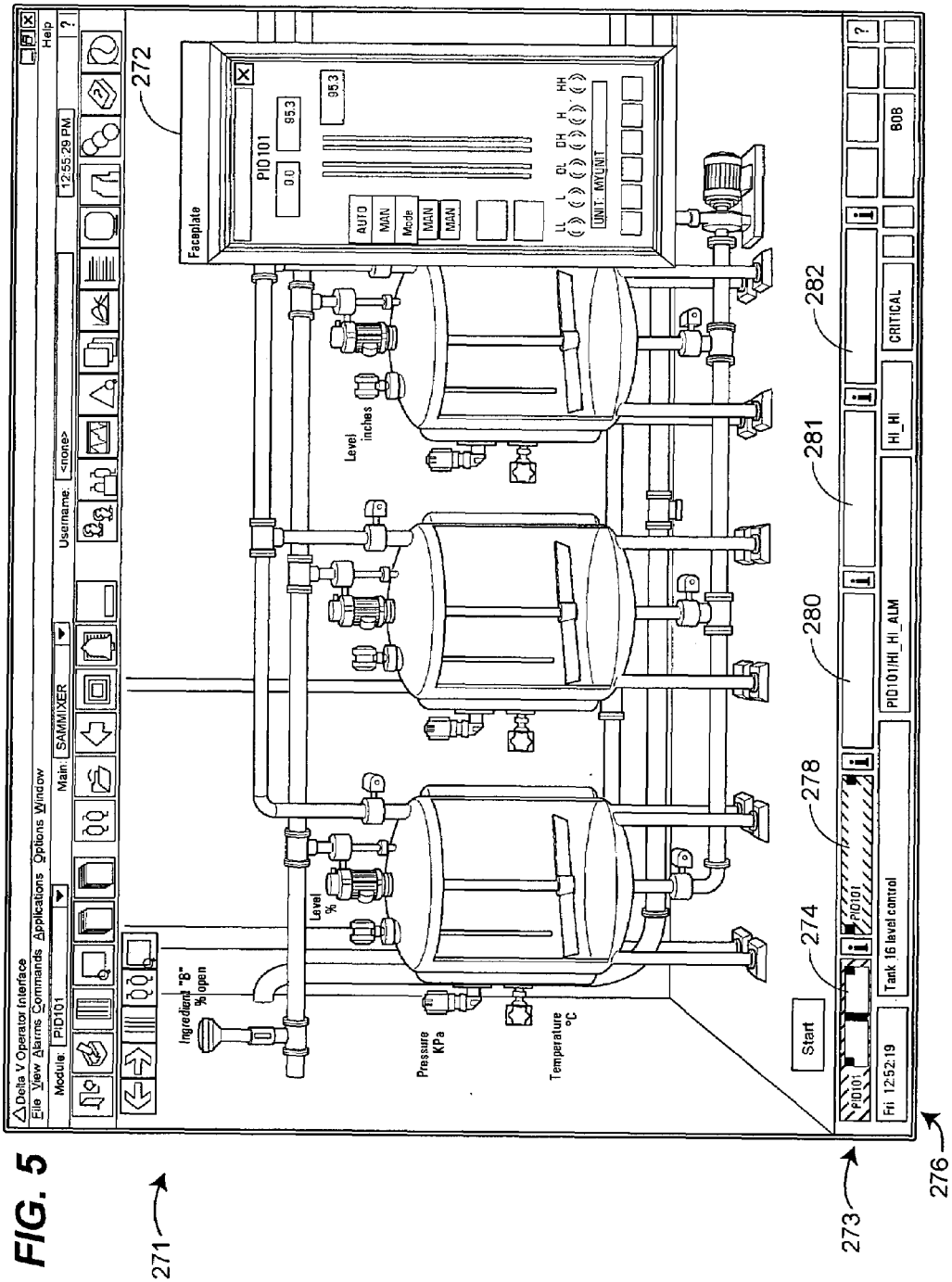
FIG. 5 is a depiction of an example alarm screen produced by the diagnostic application of FIG. 4 displaying alarms from both the process control system and the safety system of FIG. 1.

FIG. 4 illustrates an example diagnostic application 82 operating within a workstation 16 to provide integrated process control and safety system alarm viewing. Generally speaking, the diagnostic application 82 displays information about the process control system 12 and the safety system 14 pertinent to the operator's understanding or ability to view the current operational status of the process with respect to the alarms present in the process. An example of a display that may be created by the application 82 is illustrated in FIG. 5 as including an alarm banner 273 having alarm indications therein and a primary display 271 illustrating a section of the process plant, including the process control and the safety system devices and other equipment associated with that section of the process plant relevant to one or more of the alarms in the alarm banner. The primary display 271 may provide information about the current state of the process plant, such as the level of fluid in tanks, the flow characteristics of valves and other fluid lines, the settings of equipment, the readings of sensors, etc. Additionally, this display may indicate the current state of safety devices, such as shut-down valves, switches, etc. Thus, as will be understood, an operator may use the diagnostic application 82 to view different parts of or equipment within the process plant 10 and, when doing so, the diagnostic application 82 communicates with the controllers 24 and 26 and the safety logic solvers 50–56 and, if necessary, the field devices 40, 42, 60 and 62 and any other devices within the plant to obtain the relevant values, settings and measurements associated with or being made in the process plant.

The diagnostic application 82 may be configured to receive alarms created by alarm generating software within some or all of the controllers 24 or 26, the I/O devices 28–36, the safety system logic solvers 50–56 and the field devices 40, 42, 60 and 62. Still further, the diagnostic application 82 may receive different categories of alarms including, for example, process alarms (which are typically generated by a process control software modules or safety system modules, such as those made up of communicatively interconnected function blocks, forming process control and safety routines used during runtime of the process), hardware alarms, such as alarms generated by the controllers 24, 26, I/O devices 30–36, safety logic solvers 50–56, other workstations 16, etc. pertaining to the state or functioning condition of these devices, and device alarms, which are generated by some or all of the field devices 40, 42, 60 and 62 to indicate problems associated with those devices. These or other categories of alarms may be generated in any desired manner. Of course, the diagnostic application 82 may present the type of alarm (e.g., process alarm, hardware alarm and device alarm) in addition to where the alarm originated, that is, if it is in the process control system 12 or the safety system 14.

If desired, the diagnostic application 82 may receive and filter alarms based on a number of factors. In particular, the diagnostic application 82 may filter alarms based on the workstation in which the application 82 is run, the operator or person logged into the workstation and operator configurable settings, such as category, type (process, hardware, device, etc.), priority, status, time of generation, source (process control or safety system), etc. of the alarm. For example, the application 82 may filter the alarms to display alarms only from the areas or sections of the plant to which the workstation on which the application 82 is run is configured to receive. That is, alarms for certain areas or sections of the plant may not be displayed at certain workstations but, instead, each workstation may be limited to displaying alarms for one or more specific areas of the plant. Likewise, alarms may be filtered by operator identification. In particular, operators may limited to viewing certain category, type, priority, etc. alarms or may be limited to viewing alarms from a section or subsection (e.g., and area) of the plant. The diagnostic application 82 also filters out alarms for display based on the operator's clearance. These workstation and operator filtering settings are referred to herein as the workstation and operator scope controls and may include security features that enable certain operators to view and manipulate either or both process control alarms and safety system alarms.

The diagnostic application 82 may also filter the viewable alarms (i.e., those within the workstation and operator scope controls) based on operator configurable settings including, for example, the category of alarm (e.g., process, device or hardware alarm), types of alarms (communication, failure, advisory, maintenance, etc.), the priority of the alarm, the module, device, hardware, node or area to which the alarm pertains, whether the alarm has been acknowledged or suppressed, whether the alarm is active, whether the alarm is a process control alarm or a safety system alarm, etc.

Referring again to FIG. 4, the diagnostic application 82 is illustrated as being executed in one of the workstations 16 of FIG. 1, which also stores and executes communication software, such as a communication layer or stack 262, that communicates with the controllers 24 and 26 via the Ethernet connection 22 to receive signals sent by the controllers 24 and 26, the safety logic modules 50–56, the I/O devices 28–36, the field devices 40, 42, 60 and 62 and/or other workstations 16. The communication layer 262 also properly formats messages to be sent to the controllers, I/O devices, field devices, safety logic solvers and other workstations such as alarm acknowledgment signals. The communication software 262 can be any known or desired communication software which is currently used with, for example, Ethernet communications. Of course, the communication stack 262 may be coupled to other software which performs other functions, such as configuration applications, diagnostic or other process applications, database management applications, etc. run within the workstation 16.

The diagnostic application 82 of FIG. 4 includes an alarm processing unit 264 which receives alarms from the communication layer 262, decodes those alarms and may store the decoded alarms in a database 266. The diagnostic application 82 also includes a filter 268 which the alarm processing unit 264 uses to determine which alarms are to be displayed on a user interface 269 (such as a CRT, LCD, LED, plasma display, printer, etc.) associated with the workstation 16. The filter 268 may have its settings stored in the database 266 and these filter settings may be preconfigured and/or may be changeable by a user based on the user's preferences.

Generally, the filter settings may control the category and priority of alarms and, if desired, may establish the order of the alarms to be displayed using a number of different criteria. First of all, the workstation and operator scope controls effect what a particular operator can see (which alarms can be displayed at a particular workstation) based on the operator identification and workstation to which the operator is logged on, whether the alarms are process control or safety system alarms, etc. In this case, an operations license may be assigned to each workstation and, without an operations license, the alarm information and all alarm list/summary displays will be empty, i.e., no active or suppressed alarms of any category (process, hardware, or device) or from any source (process control system or safety system) will be shown by the alarm processing unit 264. Still further, only alarms from a plant area in the current operator's scope (the operator is usually given at least one security key in the plant area) are eligible to appear in the alarm displays on that workstation. Also, only alarms from a plant area and unit which has not been "turned off" using the plant area or unit filtering display(s) are eligible to appear in the alarm display. In this manner, the filter 268 first prevents the display of alarms outside of the workstation and operator scope and alarms from plant areas or units that have been turned off by the operator.

After testing alarms for conformance to the workstation and operator scope controls, the filter 268 then filters out and determines the display order of alarms based on operator settings, which may include, for example, the category of alarm, the priority of the alarm, the type of alarm, the acknowledged status of the alarm, the suppressed status of the alarm, the time of the alarm, the active status of the alarm, the source of the alarm (i.e., from the process control system or the safety system), etc. The received alarms, which are sent to the application 82 using alarm messages, will include a parameter for each of these values and the filter will filter alarms for display by comparing the appropriate parameters of the alarms to the filter settings. The alarm processing unit 264 may detect the source of the alarm based on the address from which the alarm originated, a field within the alarm message, etc. While the operator may set the order of display of the alarms which are passed by the filter 268, the order may also be determined by preconfigured settings, which leads to a more consistent display of the different alarms.

In any event, the operator can customize the manner in which alarms are displayed based on the source and/or the categories of alarms that the operator or user is most interested in, which could be all of one category of alarm such as process alarms, device alarms, or hardware alarms or all of one source of an alarm such as a process control alarm or a safety system alarm or a combination of two or more categories and sources of alarms. The user may also have control over how the alarms are presented and what information is provided with the alarms. In this manner, the diagnostic application 82 can be used to enable a single person to perform the operations of a safety operator and a process control operator. Alternatively, at different times in the same system, a process control operator can use the same system to view just the process control alarms while a safety operator can view safety alarms. In this manner, the same diagnostics application can be used by different types of people at the same time (in different workstations) to view different aspects of the alarms associated of the operational functions of the process control system 12 and the safety system 14.

After the alarm processing unit 264 uses the filter 268 to decide which alarm(s) should be displayed to the user via the display 269 and the order in which the alarms should be displayed, the alarm processing unit 264 provides this information to a user display interface 270 which uses any standard or desired operating system to display alarm information on the alarm display 269 in any desired manner. Of course, the user display interface 270 obtains other information it needs, such as information about the layout of or configuration of the process control system 12 and the safety system 14, the values of parameters or signals within those systems, etc. from the database 266 or from other communication signals received from the process plant via the communication layer 262. Also, the user display interface 270 receives commands from the user requesting, for example, more information on particular alarms, changes to alarm or filter settings, new alarm displays, etc. and provides this information to the processing unit 264 which then takes the requested action, searches the database 266 for the alarm information, etc. to provide a new alarm view to the user via the display 269.

As noted above, the different categories or sources of alarms, including process control alarms and safety alarms are sent to and received by the diagnostic application 82 for potential display on the display device 269 in some convenient message format. As a result, different categories and types of alarms may integrated on the same interface to provide an operator more information pertaining to the faulty operation of the process control system and the safety system. With the integrated displays described herein, an operator can view actual process control and safety system alarms on the same screen or display device, and can treat each of the alarms in the same manner.

There are, of course, many ways in which the different process control and safety alarms may be displayed in an integrated manner on a user interface. In one embodiment, the process control and safety system alarms may be treated similar to the way in which process alarms have traditionally been treated on a display. As a result, an operator can acknowledge or suppress safety alarms in the same way that the operator acknowledges or suppresses process control alarms. Likewise, process control and safety system alarms may be displayed in a manner that indicates the type, priority, name, section of the process, state, etc. of the alarm. Also, a primary display associated with an alarm may be presented to the user, with the primary display being a display that is made to help the user understand or see the source of the alarm or functionality of the hardware or software element associated with the alarm, such as the module, process loop, device, node, area, etc. for which the alarm was generated or with which the alarm is associated.

A primary display may be, for example, a physical picture of a device, a digital picture or drawing of the room or the area in which a device is located, other information associated with the device such as part of a plant drawing, schematic or conception drawing illustrating the connections between the device in the plant during implementation, etc. Primary displays for alarms can be created by users and may, for example, be oriented to modules (for process alarms), to devices (for device alarms) and to nodes (for hardware alarms) or to areas or sections of the plant associated with the alarm. The primary displays may also be geared to different functions. For example, process alarm primary displays may be oriented to process operation functions, device alarm primary control displays may be oriented to field device maintenance functions and hardware primary control displays may be oriented to node maintenance functions. Primary displays for hardware alarms may be, for example, pictures of where the controller is located, schematics of the controller's I/O hardware with all hardware alarm statuses indicated, buttons to navigate to the unit overview or primary displays that a controller is supporting, maintenance procedure checklists, etc. Likewise, primary displays for device alarms can be created by users and may, for example, be oriented to device maintenance functions. The primary displays may be stored in the database 266 (FIG. 4) and may be accessed and presented on the display 269 when an alarm using that primary display is selected. Of course, the same or different primary displays may be used for different alarms.

In one embodiment, the integrated alarm information is provided to a user on a display in the form of an alarm banner at, for example, an edge of a display screen. Referring now to FIG. 5, the alarm banner 273 is located on the bottom of the screen. The alarm banner 273 includes a first line that displays indications of various alarms that have been generated by the process control system 12 and the safety system 14 and that have passed through to the display by the filter 268. At least one of the alarms indicated in the alarm banner 273 may be associated with the portion of the process control system and safety system depicted in the primary display 271. The specific alarms displayed in the alarm banner 273 and the order of these alarms are determined according to the filter settings of the filter 268. Generally speaking, the highest priority alarms which have not been acknowledged or suppressed will be displayed first, with the next highest priority arms being displayed next, and so on. In the example screen of FIG. 5, the highest priority alarm 274 is a process control alarm illustrated as being associated with a control routine having the name PID101. The alarm 274 is displayed in red to illustrate that its priority is critical. On the second line of the alarm banner 273, an alarm information field 276 displays alarm information associated with the alarm in the alarm banner 273 that is currently selected. In the example of FIG. 5, wherein the process control alarm 274 is selected, the alarm information field 276 illustrates that the alarm 274 was generated on Friday at 12:52:19, is associated with the "tank 16 level control," has a designation or name of PID101/HI_HI_ALM, has a high, high priority and is a critical alarm. If the alarm 274 is flashing, this means that the alarm is not acknowledged, while a constant (non-flashing) alarm indication in the alarm banner 273 means that the alarm has been acknowledged by some operator or user. Of course, other types of alarm information could be displayed on the alarm information field 276.

Of course, other alarm indications in the alarm banner 273, such as the alarm indication 278, could be a safety system alarm associated with the safety system devices in a relevant area or section of the process plant. This safety system alarm can be any type of alarm, including a process alarm (generated by safety logic modules), a hardware alarm (generated by a safety logic solver) and device alarms (generated by one of the safety system field devices 60, 62). These other alarm indications could be other colors like yellow, purple, etc. to indicate other levels of seriousness or priority associated with the alarm or other sources of the alarm. When another alarm is selected, such as the alarm 278, 280, 281 or 282, alarm information pertaining to that alarm would be displayed in the alarm information field 276. Viewing an alarm in the alarm banner 273, the operator can acknowledge the alarms and alert the maintenance or engineer personnel to take the appropriate actions to correct the condition which led to the alarm or, alternatively, could take other steps within the process control system or the safety system, as appropriate, such as resetting certain set points to alleviate the alarm condition. When used to display only process control alarms, the display of FIG. 5 is similar to a known operator display now provided in the DeltaV control system. However, as will be understood, the alarm display of FIG. 5 integrates the display and control of both process control system alarms and safety system alarms.

As indicated above, by selecting one of the alarms in the alarm banner 273 (such as the alarm 274), a primary display 271 for that alarm is presented. In particular, as shown in FIG. 5, the main body of the screen includes a primary display 271 or depiction of pertinent hardware associated with a particular alarm (a selected alarm) within the process plant. In the example of FIG. 5, the hardware includes three tanks interconnected by various valves and fluid flow lines along with various sensors attached thereto. This hardware depiction is a representation of the equipment within a portion of the process plant and provides certain information about operation of some of the equipment, such as certain values or parameters associated with the tanks, sensors etc. The depicted equipment may be either or both process control equipment and safety system equipment. Of course, some of this information may be provided by configuration information stored in the database 266 or signals from the sensors in the process control system and the safety system. In the later case, such information is sent up through the communication layer 262 and is provided to the user display interface 270 via any known or desired software.

Also, as illustrated in FIG. 5, a face plate 272 depicting a "virtual instrument" for a PID control unit (module) is illustrated as additional information for one of the alarms (in this case, the process control alarm 274) within the alarm banner. The face plate 272 provides further information pertinent to the selected process control alarm and identifies the name of the control unit (the module PID101) and certain settings or parameters associated with that module. The generation of such a pictorial description of the process is now used for process control alarms and is known in the art and thus, will not be described in detail. Suffice it to say that this or any other desired pictorial or non-pictorial description of part of or the entirety of the process plant may be displayed on the screen to enable a user, such as an operator, to view the operational functions or hardware functions of any part of the process plant, including process control system entities and safety system entities. The displays, of course, may depict or otherwise represent individual hardware units, related groups of hardware, block diagrams or other diagrams of portions or areas of plants, etc.

Referring again to FIG. 4, the diagnostic application 82 may also include an active alarm summary control routine 290 and a suppressed alarm summary control 292. These routines may be used to provide displays to a user illustrating a summary of the active alarms or the suppressed alarms currently within the system. Of course, these summaries may be organized and presented on the display 269 in any manner or fashion, it being understood that these summaries may summarize process control system alarms and safety system alarms together in the same display or list or separately if so desired. Of course, the diagnostic application 82 may also include a security routine 294 that implements the appropriate security procedures in deciding whether a user can view and manipulate any particular alarm. In particular, the security routine 294 may implement a set of rules designed to control which users can view process control and/or safety system alarms and which users can manipulate these alarms by acknowledging these alarms, suppressing these alarms etc. Thus, the security application 294 may enable a particular user to acknowledge or suppress certain process control alarms but not safety system alarms, allow another user to acknowledge or suppress certain safety system alarms but not process control system alarms and allow a further user to acknowledge or suppress both types of alarms. Of course, different rules or privileges may be established and enforced for viewing the process control and safety system alarms, for acknowledging these alarms, for suppressing these alarms, etc. If desired, alarms of various types may be displayed together so that, for example, safety device alarms may be displayed with process control device alarms, safety process alarms may be displayed with process control system process alarms and safety hardware alarms may be displayed with process control system hardware alarms. Of course, these different alarms can be viewed together or viewed separately based on the types and sources of the alarms or any combination thereof.

Still further, safety alarms and events are electronically stored along with the process alarms and events in the same database with each being time chronicled when stored in the database. As a result, a time chronicled historical record of process alarms and events is integrated with time chronicled historical record of safety alarms and events and this integrated database can be used to more easily see and determine the interaction between the process control system 12 and the safety system 14 based on the alarms and events taking place therein.

It will be understood that the diagnostic application 82 can use the same user accounts and privileges described above with respect to the configuration application 80 to define different diagnostic or alarm viewing access privileges, with these privileges being able to be set to enable different user entities to view, acknowledge, turn off (enable/disable) alarms based on the type of the alarm, the source of the alarm (process control or safety system), etc. As will be understood, some users may be able to view, acknowledge or turn off only process control system alarms, only safety system alarms or some or all of both. Still further, preferences may be associated with each user account to enable the diagnostic (e.g. alarm viewing) application 82 to automatically provide different views, filter settings, etc. based on which user entity is accessing the application 82.

While an integrated alarm (and alert) viewing application has been discussed as an example of an integrated diagnostics application 82, other types of integrated diagnostic applications could be used as well. In particular, a diagnostic application 82 could present a hierarchical view of the areas, units, devices, controllers, modules, logic units, etc. in the process plant to enable a user to obtain any diagnostic information contained within the plant, such as that contained within the devices or equipment within the plant. Such a hierarchical view may be similar to the configuration view of FIG. 3, but illustrate the different devices, modules, etc. for each of the process control and safety systems associated with different areas, units, etc. Using this view, a user could drill down into a process area, unit, etc. to get to either (or both) a process control system device, module, function block, etc. or to a safety system device, module, function block, etc. At any point in the view, the user may be able to access or see the diagnostic data currently available from or about the device, module, function block, etc. including diagnostic data generated by the device, module, function block, etc. itself or diagnostic data determined by other tools, such as calibration and testing tools (which can be hardware and software tools) about that entity. This diagnostic data may include health data, mode and status data, current settings or operational parameter data or any other data available from the equipment. In this manner, the user can use the diagnostic application 82 to obtain an organized and integrated understanding of the current state an health of both the process control system equipment and the safety system equipment, and to obtain access to any diagnostic data in the plant via a common application and even via a common display screen.

Additionally, such a diagnostic application 82 may provide summary views containing diagnostic data from either or both the process control system equipment and/or the safety system equipment. Still further, the integrated views may be rolled up so that diagnostic data for a unit, area, etc. may be viewed in a summary or combined manner and so that an overall integrity may be determined about that area, unit, etc. using the diagnostic data from both the process control system equipment and the safety system equipment in that area, unit, etc. If desired, diagnostic tools may also be stored in and implemented from this diagnostic application. For example, a control loop tuner (which may, for example, be used on either a safety system control loop or a process control system control loop) may be stored in and run from the diagnostics application 82. A user may select to run this tool when diagnostic data about a control loop or module indicates that a control loop is poorly tuned or not operating within desired tolerances. Other diagnostic tools may include calibration and testing tools used on any types of devices, logic modules, etc.

Still further, a common security application may be run in a workstation 16 (FIG. 1) to provide security for that workstation which enables a user to log on to the workstation only once (via, for example, a user account) and be able to run different applications to, for example, configure/commission, download, view, and operate (i.e., write parameter values to) either or both the process control system 12 and the safety system 14 based on the privileges that have been assigned to the user entity and the workstation 16. This integration of applications via a common security application allows users to more easily manage the combined functionality (e.g., there is one place to configure alarm priorities, security, etc.) and will also make it easier for users to extend the system, modify the system (because no mappings are needed to re-work the system) and upgrade the system (because a single coordinated upgrade strategy can be used for both the process control system and the safety system). Moreover, users can manage the upgrade of the devices, the control system, and the safety system as a whole, or in parts, as the need arises. Furthermore, users will not have to test different parts of the system separately and hope that everything works together when all of the parts are put in-place because the integrated nature of the system enables them to configure, test and diagnose everything together.

Figure 6:
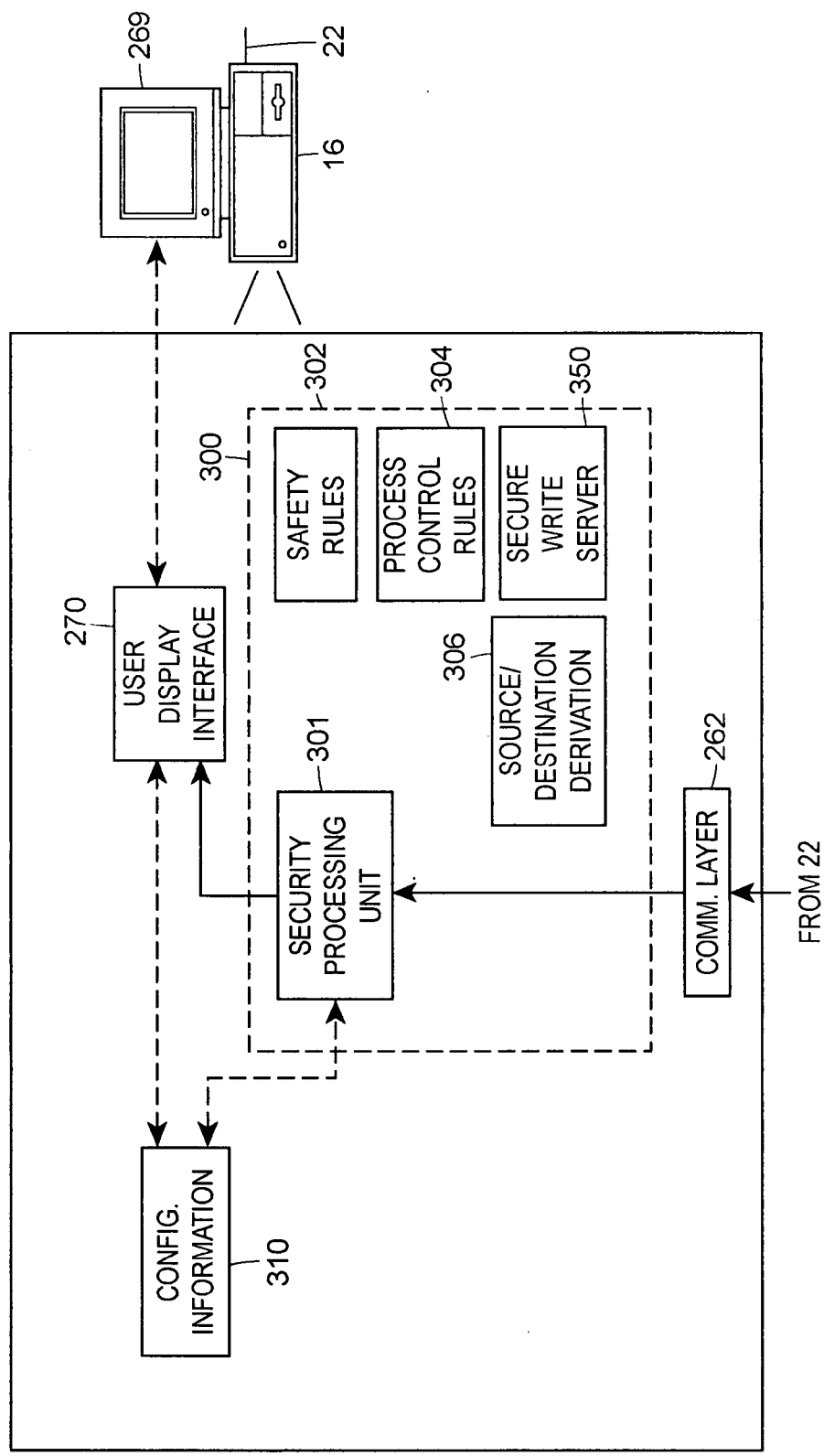
FIG. 6 is a block diagram of an example security application disposed within one or more of the workstations of FIG. 1 that automatically enforces different security rules with respect to writing data to and reading data from the process control system devices and the safety system devices of FIG. 1.

FIG. 6 illustrates a security application 300 disposed in one of the workstations 16 of FIG. 1 that may automatically implement security procedures on actions (such as reads and writes) taken within the integrated process control system and safety system of FIG. 1 based on whether the action (e.g., read or write) is associated with a process control system device or a safety system device. While the security application 300 is illustrated as a stand-alone application, it will be understood that this application may be incorporated into any other applications used in the operator workstations 16 (or any other computers) of FIG. 1 to assure that reads from and writes to the safety system 14 (and, if desired, the process control system 12) are made in a secured manner. Still further, while the security application 300 may be used as part (e.g., a subroutine) of the configuration application 80 and the diagnostic application 82 discussed above, it may also be used in any user interface application 85 that enables a user to make changes or writes to the process control system or the safety system or to view information about these systems. Also, as will be understood, the security application 300 may establish an enforce the user accounts and access privileges discussed above with respect to the configuration and diagnostic applications 80 and 82.

The security application 300 is illustrated in FIG. 6 as being communicatively coupled between a communication layer 262 and a user display interface 270 such as those discussed above with respect to FIG. 4 within the workstation 16 and includes a security processing unit 301 that performs security procedures with respect to any desired read from or write to the process control system 12 or the safety system 14. The security application 300 may store a set of safety system rules 302 and a set of process control system rules 304 which define the types and nature of the security to be performed for reads from and writes to the safety system 14 and the process control system 12, respectively. The security processing unit 301 may operate in conjunction with the user display interface 270 to detect requests for reads from or writes to elements within the process control system 12 and the safety system 14.

Based on information from the user display interface 270 pertaining to a requested read or write activity, the security processing unit 301 may use a source/destination derivation file 306 to determine whether the requested read or write pertains to a process control system element (or parameter) or to a safety system element (or parameter). The source/destination derivation file 306 may simply provide information about what fields in the display produced by the user interface correspond to which elements in the process plant and, if desired, may store the tags or addresses associated destinations of display fields within the display on the user interface to thereby enable the security processing unit 301 to determine whether a particular action or request on the user display relates to a process control system element or a safety system element. If necessary, the security processing unit 301 may also or instead use configuration information stored in a configuration database 310 to determine whether a particular element is a safety system element or a process control system element. In any event, after determining whether a requested action pertains to a process control system element or a safety system element (and, generally speaking, after determining the address or tag associated with a requested read from or a write to such an element), the security processing unit 301 may access the safety rules 302 or the process control rules 304 to determine whether such a read or write is allowed and, if so, any security procedures to implement with respect to such a read or write.

For example, using the user display 269, a user may request to change a parameter within a safety system device, such as a set point associated with detecting a fault condition. The security processing unit 301 (usually in conjunction with or as part of the application that is designed to enable such writes) will determine the destination of that write by determining the address or tag of the parameter for which a write is requested. Such an address or tag may be stored in or derived using the source/destination derivation file 306. Based on the address or tag, the security processing unit 301 will determine whether the request is being made to a safety system parameter or a process control system parameter. If the request is being made to the safety system parameter, the security processing unit 301 will use the rules in the safety rules database 302 to determine if this write is allowed, i.e., if the user has the appropriate authority to make the write to the unit. In some cases, the user interface application may already know the identity of the user and indicate ahead of time the write abilities of the user by graying out sections of the user interface screen to which the user cannot write. In other cases, the user interface application, at the prompting of the security processing unit 301, may request the user to provide a password and user identification and may check these for the proper authority before making the requested write.

On the other hand, if the requested write is being made to a process control system device, the security processing unit 301 may access rules (or access privileges) within the process control rules database 304 to determine if the user has the appropriate authority within the process control system to make the requested write. It will be understood that the security processing unit 301 may enforce the same or different security rules for reads and writes as well as the same or different security for actions to process control system elements and safety system elements. In any event, when the security processing unit 301 determines that the user (which can be an application in addition to a person using a user interface) has the appropriate authority for the requested read or write, the security processing unit 301 causes the communication layer 262 to send an appropriate message to read or write to process control or safety system device. Additionally, the security processing unit 301 may implement any other security procedures (as stored in the rules database 302 or 304), such a write verification procedures, required for a read or a write.

Figure 7:
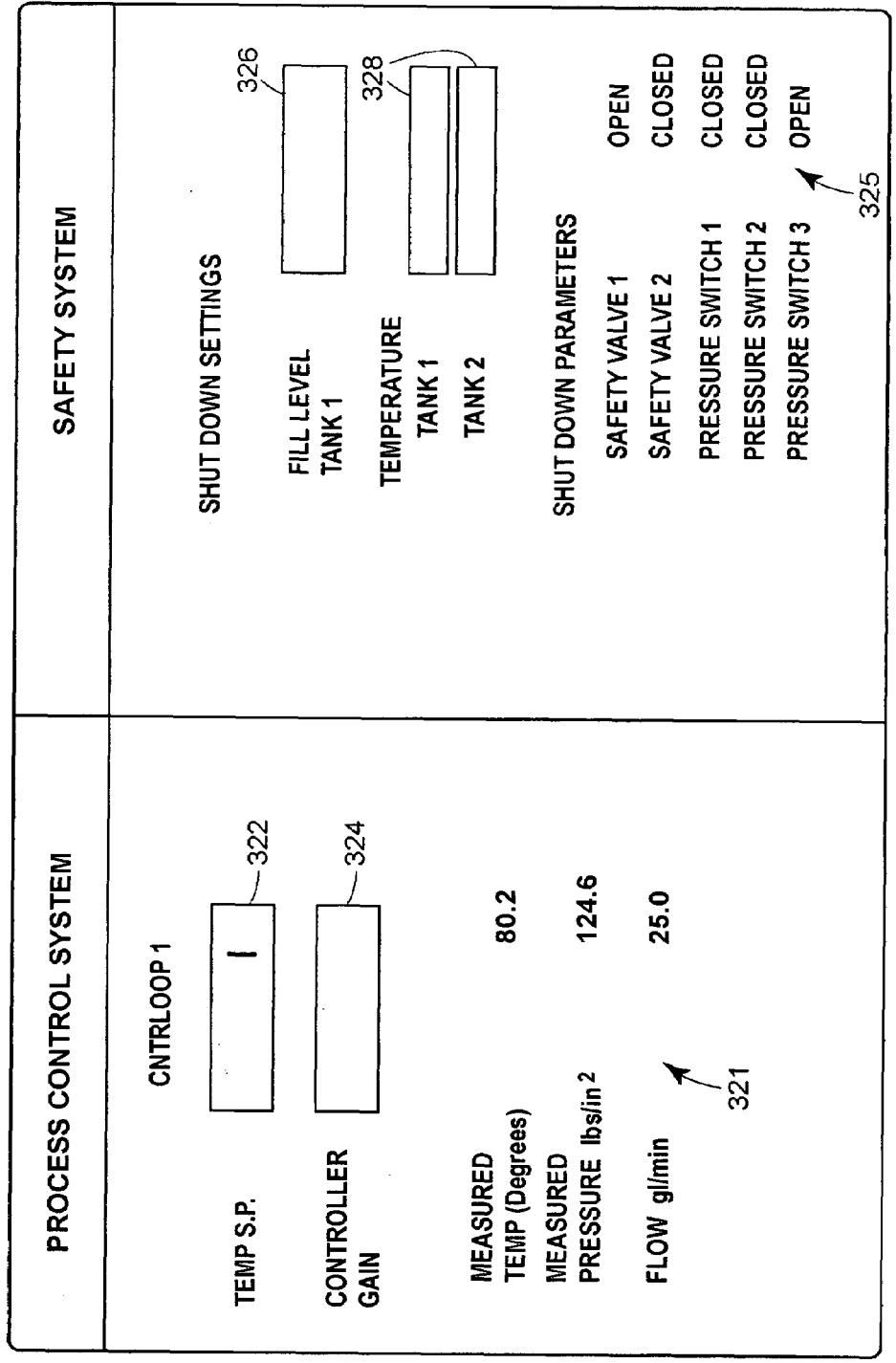
FIG. 7 is a depiction of an example operator interface display that enables secured writes to and reads from different devices within the process control system and the safety system of FIG. 1 using the security application of FIG. 6.

FIG. 7 illustrates a simple display screen 320 showing a user interface that enables a user to read from and write to both process control system elements and safety system elements using the security provided by the security application 300. In particular, the left hand side of the display screen 320 is associated with process control system reads and writes for a particular process control system element while the right hand side of the display screen 320 is associated with safety system reads and writes for a particular safety system element.

As will be understood from FIG. 7, a user (or the underlying application) may view (read) values associated with a process control system control loop named CNTR-LOOP1 including various temperature, pressure and flow values currently being measured within that loop. Such reads may be permanent (non-user changeable), as illustrated in the display 320 in the area 321. Additionally, the user may view the current temperature set point and controller gain used within the control loop named CNTR-LOOP1. If desired, the user may change these values by entering new values within the fields 322 and 324 associated with the temperature set point and the controller gain.

In a similar manner, the user may view and change information pertaining to a safety system element using the display 320. In particular, the right hand side of the screen 320 illustrates information associated with a safety system loop (which may be, for example, associated with the hardware being controlled by the control loop CNTR-LOOP1). In this case, certain safety system values, such as the current state of shut down valves and pressure switches may be illustrated (as shown at 325). Still further, user configurable safety system parameters, such as a shut down fill level for a tank named Tank 1 and shut down temperatures for tanks named Tank 1 and Tank 2 may be shown in fields 326 and 328 which additionally allow these parameters to be changed by the user.

Generally speaking, each of the fields in the screen 320 is associated with an address or element within the process control system or the safety system and this association may be stored in the source/destination derivation file 306 (FIG. 6). In any event, the security application 300 of FIG. 6 may be used to assure that, when a particular user tries to change a writable parameter, that the user has the appropriate level of authority to do so. Thus, the security application 300 may access and enable parameters to be read from the process control or the safety system only when the user or requesting application has the appropriate authority or authorization. Because of the common communication format that uses addressing, tags or other fields to distinguish process control system elements from safety system elements, the security application 300 can easily distinguish and implement separate security for process control system reads and writes and for safety system reads and writes (based on the fields within the screen 320), thereby enabling these reads and writes to be made from a common user interface application. Of course, the security application 300 may operate in conjunction with the user interface application to gray out areas in the display 320 to which the user does not have read or write privileges. While the security application 300 is described herein as providing security for reads and writes to the process control system and the safety system (and the devices and other entities therein), it will be understood that the security application 300 may also enforce other levels of access for the different applications, such as enabling or preventing the creation of logic modules, downloading logic modules, performing calibration procedures, viewing, acknowledging and enabling/disabling alarms, etc.

As will be understood, user security is uniquely defined for the safety system values as compared with process control system values and additional protection for on-line user changes may be implemented for safety system values over process control system values, with such additional security being defined by the safety rules database 302 and the process control rules database 304 (FIG. 6). In fact, it is the ability to recognize the difference between safety system values and process control system values that enables the unique handling of safety system values to be achieved. Thus, using the security application 300, any application can automatically recognize safety system reads and writes and ensure that the correct security and write verification are, in place to change a value within the process plant 10. This automatic method of implementing secured writes can be used to ensure that the write values sent to the safety controller are valid, thus eliminating an extensive amount of user programming required with other types of solutions.

As an example of a security procedure, a method of performing secured writes will be described in more detail below. As background, the IEC 61511 standard requires a repeat confirmation step whenever a change is made to an operational parameter of a safety system. The security processing unit 301 may automatically implement this repeat confirmation step if it is defined as a procedure to be implemented for safety system writes within the safety rules database 302. Thus, using the rules database 302, the security application 300 can enforce a repeat confirmation step (or any other procedure) during all writes to the safety system with no additional programming or special configuration on the part of a user.

The IEC standard is worded in a way that indicates a desire to prevent the operator from selecting the wrong item to change, or not understanding the process implications of the change, and to help prevent message corruption. To implement this standard, most known integrated process control and safety systems map data from the process control system to the safety system and then create 'are you sure' dialogs within the operator graphics before sending a single message that changes the safety system.

However, a more secure method of implementing a secured write feature that may be used for all applications, such as operations, configuration and diagnostics applications, will be described in detail below. It should be noted that this technique or feature may be applied to any user initiated change or action to the safety logic solver initiated from any application and, as such, can be used to change values in a safety system logic solver using any commands such as commission commands, download commands, lock commands, switchover commands, etc. In addition, the secured write feature described below can be implemented for any messages sent between any two applications to provide enhanced security to prevent both accidental corruption and unauthorized changes such as those initiated by hackers, viruses and the like.

To implement a secured write feature, a secure write server 350 (FIG. 6) is located within the host computer 16 and, as illustrated in FIG. 1, a secure write client 360 is located in the process control system controllers 24 or 26 (called controller clients 360) and a secure write client 380 is located in the safety logic solvers 50–56 (called the logic solver clients 370). When a change command is initiated by a user or other type of application, the security application first verifies that the user (or application) has the required access privileges or permissions to make the change. If so, the secured write server 350 and the clients 360 and 370 operate to assure that the user intended to make the change and that the message is not corrupted during the transmission either from the host computer 16 to the controllers 24 or 26 or from the controllers 24 or 26 to the safety logic solvers 50–56. Furthermore, the secure write server 350 and the clients 360, 370 assure that the message arrives at the correct destination while at the same time preventing a spuriously generated message from causing a change.

Generally speaking, upon receiving a change command from the user or other type of application, the secure write server 350 packages the change command with the needed data, such as the destination, parameter to be changed, value, etc. and adds a cyclical redundancy check (CRC) field that is created for that package or message. The secure write server 350 then sends the change command with the CRC to the appropriate controller client 360 which acknowledges the change command (and, if desired, could send a response back to the secure write server 350 with the details of what the controller client 360 received as the change information). The secure write server 350 displays change information, such as the name, descriptor of the item and what was the requested to be changed to the user for verification. If desired, the secure write server 350 may use the change data from the change command as sent to the controller client 360 to assure that the user is verifying the information that was actually sent to the controller client 360. On the other hand, if the controller client 360 sends the change data, as received by the controller client 360, back to the secure write server 350, the secure write server 350 may display this information to the user for verification.

The secure write server 350 may display the change information to the user via, for example, a dialog box on the user display, that allows the user to verify (by selecting an OK or a confirm button in a dialog box) that the change information is correct. When verified by the user (or an application if need be), the secure write server 350 sends a second change command (a repeat change command) to the controller client 360 with the change details as verified by the user. In particular, the secured write server 350 packages the change command data (as verified by the user), including, for example, the destination, parameter to be changed, value, etc. along with a CRC created for that package or message and sends this second change command to the controller client 360. It should be noted that, if no corruption has occurred, the first change command (and CRC data) and the second or repeat change command (and its CRC data) will be identical.

Upon receiving the second or repeat change command, the controller client 360 compares the second change command with the first change command to see if they are the same (meaning that no corruption has occurred and that the user has verified the change information present in the first change command). If desired, the controller client 360 may simply determine if the two change messages are the same or have the same CRC data. Alternatively, the controller client 360 may decode the messages to see if the change information is the same in each, although this action may not be allowed in some safety systems. If the messages or the change information are the same, the controller client 360 then sends a change request to the appropriate logic solver client 370. If desired, this change request may include the change information from both the first and second change commands. Alternatively, just the CRC data from both change commands and the change data from one of the commands, e.g., the first change command, may be sent as part of the change request from the controller client 360 to the logic solver client 370.

The logic solver client 370 receives the change request, and decodes the request to assure that the change request was sent to the correct place and is otherwise uncorrupted. These steps may involve checking one or both CRC data packets to determine if the CRC information correctly corresponds to the encapsulated change message, determining if the CRC packets are the same (which they should be) and determining if the destination for the change is located within or through the safety logic solver. If the change information from both the change commands are within this message, the logic solver client may again check to determine if the change information is the same as a check to assure that no corruption has occurred in the transmission from the controller client 360 to the logic solver client 370. If the logic solver client 370 determines that the change message is correct the logic solver client 370 may cause the logic solver 50–56 to implement the change and sends an acknowledgement back to the controller client 360 that the change is being implemented. The controller client 360 may send this acknowledgement to the secure write server 350 which may display an acknowledgement to the user that the change is being made. If an error occurs anywhere in the process, the logic solver client 370 and/or the controller client 360 may inform the secure write server 350 of the error and any known details about the error (such as, the CRCs did not match, the message reached an incorrect destination, etc.). The secure write server 350 may then inform the user that the change was not implemented, and of any desired details about the error that occurred in the writing process.

As one example, a user may enter a desired change via a secure write dialog box in a display screen. After determining if the user has the authorization to make the change, the application then calls the secure write server 350, passing the path, parameter type and current value to the secure write server 350. The secure write server then generates a secure write request with the command (Parameter, Change), the path, the new value and the CRC and sends this secure write request to the appropriate process control system controller 24 or 26. The secure write server 350 then creates the confirm dialog with the user using data from a copy of the CRCed data sent to the controller 24 or 26. The dialog box may illustrate the path and the value and the secure write server 350 may cause the confirm or OK button within the dialog to be enabled only when the change command has been acknowledged by the proper controller 24 or 26. Upon receiving the change command, the controller client 360 within the controller 24 or 26, acknowledges the change command and stores the CRCed data item in the corresponding module or block.

At this point, the user verifies that the value in the confirm dialog box is correct and selects the confirm or OK button. The secure write server 350 then generates the second or repeat change command (the second message) as including the command (Parameter, Change), the path, the value from the confirm dialog and the CRC for this data and sends this message to the controller client 360. The process controller 24, 26 receives the second or repeat change command and compares the CRCed data item from this command to the one stored earlier (associated with the first change command). If they are the same, the two items (e.g., the entire first change command with CRC and the CRC from the second change command) are placed into a change request to be sent to the appropriate logic solver 50–56. As a result, only change requests that have been verified are sent to the safety logic solver 50–56, which further reduces the chance of making unauthorized changes and any corruption due to control network communications, workstation problems or controller problems are detected at the controller client.

The logic solver client 370 receives the change command and verifies that the two CRCs match. The logic solver client 370 then takes the change data within the message and verifies the CRC for that data. If the CRC is good or correct, the path is then checked to ensure the message has been sent to the correct place. This last verification step ensures that no corruption occurred in the communication path from the controller 24, 26 to the safety logic solver 50–56. When the logic solver client 370 verifies that all the checks are good, the value is written to the parameter and the status of the write is returned to the controller client 360 which, in turn, may provide a verification message to the secure write server 350 to be displayed to the user.

Using this procedure, both the original request and the confirmed request are compared by a human, the controller and the safety logic solver, which makes this procedure more secure than other known solutions that only provide for comparison by the human without the use of two requests. In fact, other systems that create repeat messages typically only do so at the user application by prompting the user with a confirmation dialog before the change command is actually sent from the user interface machine. However, these systems only send one message to the safety device in which the item is to be changed. As a result, these known techniques do not prevent corruption during the transmission or assure that the message arrives at the correct destination (e.g., when the destination field within the message gets corrupted).

While the repeat write procedure has been described above as going from a server 350 to a controller client 360 and then to a logic solver client 370, it will be understood that the procedure could include more or less stages. If more stages are used, the third and subsequent stage can operate, on the receiving end, similar to the logic solver client 370 and, on the sending end, similar to the controller client 360, until the last stage. If fewer stages are used, the server 350 should still send two write commands, but if the client detects that they are the same, then the client can implement the change. Furthermore, it will be understood that the server 350 and the clients 360 and 370 can be implemented in software, hardware or firmware using any desired communication and software protocol.

As indicated above, messages from and to safety system devices and process control system devices may be detected by the address or tag associated with the device. If desired, the source address for the various safety logic devices may be derived from railbus messages and may be made up of a backplane ID (BPID), which is the same at each node but unique within the process plant, and a slot ID (SID), which may be repeated from node to node but is unique within a node. In this manner, each device may have a unique address and thus be distinguishable as a safety system device or a process control system device.

Although the embedded safety system may employ any one of a number of possible message structures or communication protocols, the following message structures may be employed in one case. In particular, bus messages may generally include three fundamental portions including a preamble, (e.g., 1-byte) data or message portion (e.g., 129- bytes) and a postamble (e.g., 1-byte). The preamble and postamble portions are provided for hardware synchronization while the data portion contains the actual message that has meaning to a given addressee. If desired, hardware bit insertion may occur within the message portion of the high-level message structure.

Generally speaking, the data or message portion of a message may be divided into seven fields with a total length of up to a maximum available length for a given application. For example, there be may 138 available bytes (including 11 bytes of protocol overhead). The message portion may include a 2-byte source address, a 2-byte destination address, a 1-byte type field, a 1-byte device status field, a 1-byte length field, a 0- to 128-byte message field, and a 4-byte CRC field which provides cyclical redundancy data. For example, in one manner of using these fields, the source address field contains the address of the sending device. The higher-order byte contains the backplane ID (BPID) and the lower-order byte contains the slot ID (SID). At power-up, each safety logic solver obtains its complete SOURCE ADDRESS from the controller via the railbus. The backplane ID (BPID) portion of the SOURCE ADDRESS is set equal to right-most octet of the controller's IP address. The slot ID (SID) portion of the SOURCE ADDRESS is derived from the process controller's railbus messages. Preferably, each safety logic solver does not communicate (transmit or receive) until it has a complete SOURCE ADDRESS.

A DESTINATION ADDRESS field may contain the address of the destination device. The higher-order byte may contain the BPID and the lower-order byte may contain the SID of the destination. The message TYPE field contains information regarding the type of message contained within the message date field. A number of different message types may be defined. The DEVICE STATUS field may be suitably divided so as to indicate, for example, the diagnostic status (indicating no error or error), the switch over status (indicating not in progress or in progress), the controller mode (indicating normal mode or engineering mode), the safe trip status (indicating not tripped or tripped), the redundant status (indicating not redundant or redundant), the configured status (indicating not configured or configured), the controller type (determined by the logic solver, and indicating standby or active), and the mode (the mode value comes from the controller via the bus, and indicates engineering mode or normal mode).

A LENGTH field may contain the length, in bytes, of the upcoming MESSAGE DATA field, and is message dependent. A MESSAGE DATA field is the payload of the message formatted according to the message TYPE, and has a length dependent on the message. Finally, the CRC or Cyclic Redundancy Check/Code field is calculated from the SOURCE ADDRESS, TYPE, DEVICE STATUS, LENGTH, and MESSAGE DATA fields, and also is message dependent.

Generally speaking, to send a message over the bus 22 (FIG. 1), the controller may encapsulate bus messages within the DATA portion of an Ethernet IEEE 802.3 Protocol packet which includes, for example, a 7-byte preamble, a 1-byte frame start delimiter, a 6-byte destination address, a 6-byte source address, a 2-byte type/length field, a 46- to 1500-byte data field and a 4-byte frame check sequence field. As is known, the frame begins with a 7-byte preamble of alternating ones and zeros. When the frame is Manchester encoded, the preamble gives the receiving stations a known pattern on which to lock. The frame start delimiter follows the preamble, signifying the beginning of the frame. The destination and source addresses are each generally irrelevant as the receivers will be listening in promiscuous mode.

The Ethernet TYPE field/IEEE 802.3 LENGTH field signifies the protocol used in the rest of the frame and the length field specifies the length of the data portion of the frame. For Ethernet and IEEE 802.3 frames to coexist on the same LAN, the length field of the frame must always be different from any type fields used. This fact limits the length of the data portion of the frame to 1,500 bytes and the total frame length to 1518 bytes. For the safety logic solver application, the type will be Ethernet and the length of the data field will be the size of the messages. The data field contains the message being sent by a safety logic solver or a process controller. Messages whose data length is less than 46 bytes will be padded. As is known, the 4 bytes of the frame check sequence field is a standard 43-bit CCITT-CRC polynomial. Of course, this is but one type of message encoding that may be performed on the messages sent to and from the process control devices and the safety system devices, it being understood that any other desired message format that is capable of distinguishing process control system devices from safety system device can be used instead.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A security system for use in a process plant having a process control system that performs product manufacturing related control functions and a safety system that performs safety related control functions with respect to the process plant, comprising:
   a computer having a processor and a memory;
   a process controller communicatively coupled to the computer and adapted to perform process control functionality using one or more process control field devices;
   a safety system controller communicatively coupled to the computer and adapted to perform safety system functionality using one or more safety system field devices;
   a security database adapted to store access privileges related to both the process control functionality and the safety system functionality;
   one or more user applications stored in the memory of the computer and adapted to be executed on the processor to communicate process control system messages to or from the process controller and to communicate safety system messages to or from the safety controller; and
   an integrated security application stored on the memory of the computer and adapted to be executed on the processor to use the security database to enable a user of the one or more user applications to access both the process controller and the safety system controller via the process control system messages and the safety system messages based on access privileges for the user stored in the security database.

2. The security system of claim 1, wherein the security database stores access privileges for one or more user accounts, wherein each user account includes access privileges for a separate user entity and wherein the user of the one or more user applications is the user entity of at least one of the one or more user accounts.

3. The security system of claim 2, wherein the security database is adapted to store access privileges defining access rights for both the process control system and the safety system based on an identity of a particular user account.

4. The security system of claim 1, wherein the security database is adapted to store access privileges defining access rights for both the process control system and the safety system based on an identity of the computer in which the one or more user applications are executed.

5. The security system of claim 1, wherein the security database stores access privileges for one or more user accounts, wherein each user account includes access privileges for a separate user entity, wherein the security database is adapted to store access privileges defining access rights for both the process control system and the safety system based on an identity of a particular user account and based on an identity of the computer in which the one or more user applications are executed.

6. The security system of claim 1, wherein at least one of the one or more user applications is a configuration application that enables configuration of both the process controller and the safety system controller.

7. The security system of claim 1, wherein at least one of the one or more user applications is a diagnostics application that enables a user to perform diagnostics with respect to both the process controller and the safety system controller.

8. The security system of claim 1, wherein at least one of the one or more user applications is a viewing application that enables a user to view data with respect to both the process control system and the safety system on a single user display.

9. The security system of claim 8, wherein at least one of the one or more user applications is a write application that enables the user to change parameters within the process control system and the safety system.

10. The security system of claim 9, wherein the security database includes a procedures database that stores a write procedure for implementing a write to the safety system and wherein the security application automatically implements the write procedure when the at least one of the one or more user applications implements a write to the safety system.

11. The security system of claim 10, wherein the write procedure is a repeat write confirmation procedure that sends two write commands to perform a write.

12. The security system of claim 1, wherein the security database is adapted to store a multiplicity of different possible levels of access privileges for each of the process control system and the safety system and wherein the security database is adapted to store a first one of the possible levels of access privileges for a particular user for the process control system and a second and different one of the possible levels of access privileges for the particular user for the safety system.

13. The security system of claim 1, wherein the security database is adapted to store a multiplicity of different possible levels of access privileges for each of the process control system and the safety system, wherein a first one of the possible levels of access privileges enables a user to read parameters from the process control system or the safety system and a second one of the possible levels of access privileges enables a user to write parameters to the process control system or to the safety system.

14. The security system of claim 1, wherein the security database is adapted to store a multiplicity of different possible levels of access privileges for each of the process control system and the safety system, wherein one of the possible levels of access privileges enables a user to create logic to be implemented in the process control system or in the safety system.

15. The security system of claim 1, wherein the security database is adapted to store a multiplicity of different possible levels of access privileges for each of the process control system and the safety system, wherein one of the possible levels of access privileges enables a user to download logic to be implemented in the process control system or in the safety system to the process controller or to the safety system controller.

16. The security system of claim 1, wherein the security database is adapted to store a multiplicity of different possible levels of access privileges for each of the process control system and the safety system, wherein one of the possible levels of access privileges enables a user to write parameters in the process control system or in the safety system.

17. The security system of claim 1, wherein the security database is adapted to store a multiplicity of different possible levels of access privileges for each of the process control system and the safety system, wherein one of the possible levels of access privileges enables a user to calibrate a device within the process control system or a device within the safety system.

18. The security system of claim 1, wherein the security database is adapted to store access privileges for each of a multiplicity of different users, wherein an access privilege for a particular user defines a first access privilege for the process control system and a second access privilege for the safety system.

19. The security system of claim 1, wherein the at least one of the one or more user applications is adapted to present a display to a user having a first set of fields related to the process control system and a second set of fields related to the safety system and wherein the security application detects if an operation is being made to the process control system or to the safety system based on an identity of a field of the display.

20. The security system of claim 1, wherein at least one of the one or more user applications is adapted to present a display to a user having a first set of fields related to the process control system and a second set of fields related to the safety system, with each field in the first and the second sets of fields having an associated tag, and wherein the security application detects if an operation is being made to the process control system or to the safety system based on the tag associated with a field of the display.

21. The security system of claim 20, wherein each tag includes a path that defines whether an associated one of the fields is associated with a process control system unit or with a safety system unit.

22. The security system of claim 1, wherein the security application detects if an operation within one of the one or more user applications is being made to a process control system unit or to a safety system unit and applies access privileges as stored in the security database based on whether the operation is being made to a process control system unit or to a safety system unit.

23. The security system of claim 22, wherein the security application stores a security procedure to be implemented based on whether or not the operation is being made to a safety system unit and wherein the security application implements the security procedure when the operation is being made to a safety system unit.

24. A security system for use in a process plant having a process control system that performs product manufacturing related control related functions using one or more process control field devices and a safety system that performs safety related control functions using one or more safety field devices, the security system comprising:
   a computer having a processor and a memory;
   a process controller communicatively coupled to the computer and adapted to perform process control system functionality using the one or more process control field devices;
   a safety system controller communicatively coupled to the computer and adapted to perform safety system functionality using the one or more safety system field devices;
   a security database adapted to store access privileges related to both the process control system functionality and the safety system functionality;
   one or more user applications stored in the memory of the computer and adapted to be executed on the processor to communicate process control system messages to or from the process controller and to communicate safety system messages to or from the safety system controller using a common communication format, wherein each message has a data field indicating whether the message is associated with a process control system entity or a safety system entity; and
   an integrated security application stored on the memory and adapted to be executed on the processor to distinguish whether an operation to be implemented by one of the one or more user applications is related to a process control system entity or to a safety system entity and to use the security database to enable a user of the one of the one or more user applications to perform the operation based on access privileges for the user stored in the security database.

25. The security system of claim 24, wherein the security database stores access privileges for one or more user accounts, wherein each user account includes access privileges for a separate user entity and wherein the user of the one or more user applications is the user entity of at least one of the one or more user accounts.

26. The security system of claim 24, wherein the data field of each message that indicates whether the message is associated with a process control system entity or a safety system entity is an address field.

27. The security system of claim 24, wherein the data field of each message that indicates whether the message is associated with a process control system entity or a safety system entity is a tag indicating a communication path.

28. The security system of claim 24, wherein the security application distinguishes whether an operation to be implemented by the one of the one or more user applications is related to a process control system entity or to a safety system entity based on the data field within a message associated with the operation.

29. The security system of claim 24, wherein the security database is adapted to store access privileges defining access rights for both the process control system entities and the safety system entities based on an identity of a particular user.

30. The security system of claim 29, wherein the security database stores access privileges for one or more user accounts, wherein each user account includes access privileges for a separate user entity and identity of the particular user is determined as the user entity of at least one of the one or more user accounts.

31. The security system of claim 24, wherein the security database is adapted to store access privileges defining access rights for both the process control system entities and the safety system entities based on an identity of the computer in which the one of the one or more user applications is executed.

32. The security system of claim 24, wherein the security database is adapted to store access privileges defining access rights for both the process control system entities and the safety system entities based on an identity of a particular user and based on an identity of the computer in which the one of the one or more user applications is executed.

33. The security system of claim 24, wherein one of the one or more user applications is a configuration application that enables configuration of both the process control system entities and the safety system entities.

34. The security system of claim 24, wherein one of the one or more user applications is a diagnostics application that enables a user to perform diagnostics with respect to both the process control system entities and the safety system entities.

35. The security system of claim 24, wherein one of the one or more user applications is a write application that enables the user to change parameters within the process control system entities and the safety system entities.

36. The security system of claim 24, wherein the security database includes a procedures database that stores a write procedure for implementing a write to one of the process control system entities and the safety system entities and wherein the security application automatically implements the write procedure when the one of the one or more user applications implements a write to the one of the process control system entities and the safety system entities.

37. The security system of claim 36, wherein the write procedure is a repeat write confirmation procedure that sends two write commands.

38. The security system of claim 24, wherein the security database stores access privileges for one or more user accounts, wherein each user account includes access privileges for a separate user entity, wherein the security database is also adapted to store a multiplicity of different possible levels of access privileges with respect to each of the process control system and the safety system and wherein the security database is adapted to store a first one of the possible levels of access privileges for a particular user account for the process control system and a second and different one of the possible levels of access privileges for the particular user account for the safety system.

39. The security system of claim 24, wherein the security database stores access privileges for one or more user accounts, wherein each user account includes access privileges for a separate user entity, and wherein the security database is also adapted to store a multiplicity of different possible levels of access privileges with respect to each of the process control system and the safety system, wherein a first one of the possible levels of access privileges enables a user account to read parameters from the process control system or the safety system and a second one of the possible levels of access privileges enables a user account to write parameters to the process control system or to the safety system.

40. The security system of claim 39, wherein a third one of the possible levels of access privileges enables a user account to create logic to be implemented in the process control system or in the safety system.

41. The security system of claim 40, wherein a fourth one of the possible levels of access privileges enables a user account to download logic to be implemented in the process control system or in the safety system to the process controller or to the safety system controller.

42. The security system of claim 40, wherein a fifth one of the possible levels of access privileges enables a user account to perform a calibration procedure to be implemented in the process control system or in the safety system.

43. The security system of claim 24, wherein the security database is adapted to store access privileges for each of a multiplicity of different users, wherein the access privileges for a particular user defines a first access privilege for the process control system and a second access privilege for the safety system.

44. A security system for use in a process plant having a process control system with a process controller adapted to perform product manufacturing related control functionality using one or more process control field devices, a safety system having a safety system controller adapted to perform safety related control functionality using one or more safety system field devices, and a host computer having a processor communicatively coupled to the process controller and to the safety system controller and one or more user applications executed on the processor to communicate process control system messages to or from the process controller and to communicate safety system messages to or from the safety controller, the security system comprising:
   a memory;
   a security database adapted to store access privileges related to both the process control system and the safety system; and
   a security application stored on the memory and adapted to be executed on the processor to enable the one or more user applications to access the process control system and the safety system via the process control system messages and the safety system messages based the access privileges stored in the security database.

45. The security system of claim 44, wherein the security database stores access privileges for one or more user accounts, wherein each user account includes access privileges for a separate user entity.

46. The security system of claim 44, wherein the security database is adapted to store access privileges defining access rights for both the process control system and the safety system based on an identity of a particular user.

47. The security system of claim 44, wherein the security database is adapted to store access privileges defining access rights for both the process control system and the safety system based on an identity of the computer in which the one or more user applications are executed.

48. The security system of claim 44, wherein the security database includes a procedures database that stores a write procedure for implementing a write to at least one of the process control system and the safety system and wherein the security application automatically implements the write procedure when the one or more user applications implement a write to the one of the process control system and the safety system.

49. The security system of claim 48, wherein the write procedure is a repeat write confirmation procedure the generates two write commands.

50. The security system of claim 44, wherein the security database is adapted to store a multiplicity of different possible levels of access privileges for each of the process control system and the safety system and wherein the security database is adapted to store a first one of the possible levels of access privileges for a particular user for the process control system and a second and different one of the possible levels of access privileges for the particular user for the safety system.

51. The security system of claim 44, wherein the security database is adapted to store a multiplicity of different possible levels of access privileges for each of the process control system and the safety system, wherein a first one of the possible levels of access privileges enables a user to read parameters from the process control system or the safety system and a second one of the possible levels of access privileges enables a user to write parameters to the process control system or to the safety system.

52. The security system of claim 44, wherein the security database is adapted to store access privileges for each of a multiplicity of different user accounts, wherein the access privileges for each particular user account defines a first access privilege for the process control system and a second access privilege for the safety system.

53. The security system of claim 44, wherein the security application is adapted to detect if an operation within the one or more user applications is being made to a process control system unit or to a safety system unit and to apply access privileges as stored in the security database based on whether the operation is being made to a process control system unit or to a safety system unit.

54. A method of performing security procedures in a process plant having a process control system with a process controller adapted to perform product manufacturing control functionality using one or more process control field devices and a safety system having a safety system controller adapted to perform safety related functionality using one or more safety system field devices, the method comprising:

storing access privileges related to both the process control system and the safety system in a security database;

detecting whether an action to be taken with respect to the process plant is an action related to the process control system or to the safety system;

determining an appropriate set of access privileges from the security database based on whether the action to be taken is related to the process control system or to the safety system; and preventing or allowing the action to be taken based on the appropriate set of access privileges.

55. The method of performing security procedures in a process plant according to claim 54, wherein storing access privileges in the security database includes storing access privileges defining access rights for both the process control system and the safety system based on an identity of a particular user entity initiating the action to be taken.

56. The method of performing security procedures in a process plant according to claim 54, wherein storing access privileges in the security database includes storing access privileges defining access rights for both the process control system and the safety system based on an identity of a computer initiating the action to be taken.

57. The method of performing security procedures in a process plant according to claim 54, wherein storing access privileges in the security database includes storing access privileges defining access rights for both the process control system and the safety system based on an identity of a particular user entity initiating the action to be taken and an identity of a computer initiating the action to be taken.

58. The method of performing security procedures in a process plant according to claim 54, wherein storing access privileges includes storing a security procedure for implementation with respect to one of the process control system and the safety system and further including automatically implementing the security procedure when the appropriate set of access privileges allows the action to be taken.

59. The method of performing security procedures in a process plant according to claim 58, wherein the security procedure is a repeat write confirmation procedure and wherein automatically implementing the security procedure includes performing the repeat write confirmation procedure when the action to be taken is a write to one of the process control system or to the safety system.

60. The method of performing security procedures in a process plant according to claim 54, wherein storing access privileges in the security database includes defining a multiplicity of different possible levels of access privileges for each of the process control system and the safety system, and including storing a first one of the possible levels of access privileges for a particular user entity for the process control system and a second and different one of the possible levels of access privileges for the particular user entity for the safety system.

61. The method of performing security procedures in a process plant according to claim 54, wherein storing access privileges in the security database includes defining a multiplicity of different possible levels of access privileges for each of the process control system and the safety system, wherein a first one of the possible levels of access privileges enables a user entity to read parameters from the process control system or from the safety system and a second one of the possible levels of access privileges enables a user entity to write parameters to the process control system or to the safety system.

62. The method of performing security procedures in a process plant according to claim 61, wherein a third one of the possible levels of access privileges enables a user entity to create logic to be implemented in the process control system or in the safety system.

63. The method of performing security procedures in a process plant according to claim 61, wherein a third one of the possible levels of access privileges enables a user entity to download logic to be implemented in the process control system or in the safety system.

64. The method of performing security procedures in a process plant according to claim 61, wherein a third one of the possible levels of access privileges enables a user entity to perform a calibration procedure in the process control system or in the safety system.

65. The method of performing security procedures in a process plant according to claim 54, wherein storing access privileges in the security database includes storing access privileges for a particular user entity that defines a first access privilege for the process control system and a second access privilege for the safety system.

66. The method of performing security procedures in a process plant according to claim 54, wherein detecting whether an action to be taken with respect to the process plant is an action related to the process control system or to the safety system includes determining whether a field in a message associated with the action to be taken identifies a process control system device or a safety system device.

67. The method of performing security procedures in a process plant according to claim 54, wherein detecting whether an action to be taken with respect to the process plant is an action related to the process control system or to the safety system includes determining whether a field in a user display from which the action is initiated is associated with a process control system parameter or a safety system parameter.

* * * * *

UNITED STATES PATENT AND TRADEMARK OFFICE
CERTIFICATE OF CORRECTION

PATENT NO. : 7,237,109 B2 Page 1 of 1
APPLICATION NO. : 10/672549
DATED : June 26, 2007
INVENTOR(S) : Cindy A. Scott et al.

It is certified that error appears in the above-identified patent and that said Letters Patent is hereby corrected as shown below:

Item 56 on title page

<u>On Page 2:</u>

In the right Column, last reference, "Ofice" should be -- Office --.

<u>In the Specification:</u>

Column 7, line 39, "62" should be -- 62) --.

Column 26, line 33, "This-hardware" should be -- This hardware --.

<u>In the Claims:</u>

Column 42, lines 5-6, "based the" should be -- based on the --.

Column 42, line 29, "procedure the" should be -- procedure that --.

Signed and Sealed this

Twenty-ninth Day of April, 2008

JON W. DUDAS
*Director of the United States Patent and Trademark Office*